United States Patent
Tran et al.

(10) Patent No.: US 11,500,227 B2
(45) Date of Patent: Nov. 15, 2022

(54) MODULAR ACOUSTIC SYSTEMS

(71) Applicant: Bose Corporation, Framingham, MA (US)

(72) Inventors: An Tran, Austin, TX (US); Craig Curtis, Chestnut Hill, MA (US); Sarah Wolfe, San Francisco, CA (US); Caitlin Hanson, Westborough, MA (US); Jeremy Heaston, Ashland, MA (US); Kyle DeCubellis, Southborough, MA (US); Zachary Provost, Marlborough, MA (US); Thomas Chambers, Bellingham, MA (US); Matthew James Storey, Austin, TX (US); Bennett Alexander Nadeau, Austin, TX (US)

(73) Assignee: Bose Corporation, Framingham, MA (US)

( * ) Notice: Subject to any disclaimer, the term of this patent is extended or adjusted under 35 U.S.C. 154(b) by 301 days.

(21) Appl. No.: 16/862,909

(22) Filed: Apr. 30, 2020

(65) Prior Publication Data
US 2021/0341762 A1 Nov. 4, 2021

(51) Int. Cl.
G02C 11/00 (2006.01)
G02B 27/01 (2006.01)
(Continued)

(52) U.S. Cl.
CPC ............ G02C 11/10 (2013.01); G02B 27/017 (2013.01); G02C 5/14 (2013.01); H04R 1/1066 (2013.01);
(Continued)

(58) Field of Classification Search
CPC .......... G02B 2027/0178; G02B 27/017; G02B 27/01; H04R 1/1066; G02C 2200/08;
(Continued)

(56) References Cited

U.S. PATENT DOCUMENTS 3,769,663 A * 11/1973 Perl ........................... F21L 4/00
24/339
7,806,525 B2 10/2010 Howell et al.
(Continued)

FOREIGN PATENT DOCUMENTS

| CN | 104793352 | 7/2015 |
| EP | 1916561 | 4/2008 |
| KR | 102033767 B1 | 10/2019 |

OTHER PUBLICATIONS

Danube Datasheet Version 1.0. Datasheet [online]. USound, Jan. 16, 2019 [retrieved on Apr. 30, 2020]. Retrieved from the Internet: <URL: https://www.usound.com/wp-content/uploads/2019/01/UAM-P-10L1010R10-Danube-Audio-Module-Datasheet.pdf>.
(Continued)

*Primary Examiner* — William R Alexander
(74) *Attorney, Agent, or Firm* — Bond, Schoeneck & King, PLLC

(57) ABSTRACT

A modular audio system which includes an acoustic module configured to be removably engaged with a head-worn peripheral device. In some examples, the head-worn peripheral device is a pair of eyeglass frames and the acoustic module is configured to removably secure to a socket arranged on the inside face of the temples of the eyeglasses. The acoustic module can slidingly, pivotably, and/or magnetically engage with the socket such that, when secured, the acoustic module is configured to generate acoustic energy in the form of audible sound proximate a user's ear while the user is wearing the head-worn peripheral device. In other examples, the temples of the head-worn peripheral device are configured to slidingly engage with a sleeve, where the sleeve includes a pocket configured to slidingly engage with the acoustic module.

22 Claims, 19 Drawing Sheets

(51) Int. Cl.
*G02C 5/14* (2006.01)
*H04R 1/10* (2006.01)

(52) U.S. Cl.
CPC .. *G02B 2027/0178* (2013.01); *G02C 2200/08* (2013.01)

(58) Field of Classification Search
CPC .......... G02C 11/10; G02C 11/00; G02C 5/14; G02C 5/143
USPC .......................................................... 351/158
See application file for complete search history.

(56) References Cited

U.S. PATENT DOCUMENTS

| | | | |
|---|---|---|---|
| 9,113,259 B2 | 8/2015 | Pan | |
| 9,672,210 B2 | 6/2017 | Osterhout | |
| D840,395 S * | 2/2019 | Osterhout | D14/372 |
| 10,250,965 B2 | 4/2019 | Bullen et al. | |
| 10,433,044 B2 | 10/2019 | Pong et al. | |
| 10,516,929 B2 | 12/2019 | Maguire et al. | |
| 10,659,868 B1 * | 5/2020 | Xu | G02B 27/0176 |
| 10,698,223 B2 * | 6/2020 | Osterhout | H04R 1/028 |
| 10,757,495 B2 * | 8/2020 | Osterhout | G06F 1/1686 |
| 10,853,589 B2 * | 12/2020 | Osterhout | G02B 27/017 |
| 2007/0030442 A1 * | 2/2007 | Howell | G02C 11/10 351/158 |
| 2009/0273755 A1 * | 11/2009 | Laventure | G02C 11/00 351/158 |
| 2013/0250232 A1 | 9/2013 | Belbey et al. | |
| 2013/0329183 A1 | 12/2013 | Blum et al. | |
| 2017/0219831 A1 | 8/2017 | Haddick et al. | |
| 2017/0363885 A1 | 12/2017 | Blum et al. | |
| 2018/0045967 A1 * | 2/2018 | Osterhout | G06F 3/03547 |
| 2018/0167707 A1 * | 6/2018 | Osterhout | G06F 3/017 |
| 2019/0113774 A1 | 4/2019 | Anderson et al. | |
| 2019/0266247 A1 * | 8/2019 | Osterhout | G06F 40/58 |
| 2020/0089008 A1 | 3/2020 | Silfvast et al. | |
| 2020/0201053 A1 * | 6/2020 | Osterhout | G02C 5/124 |
| 2020/0202083 A1 | 6/2020 | Vartiovaara | |

OTHER PUBLICATIONS

YouTube video clip entitled "Titus Push Latch—Push Opening System for Doors and Drawers," 1 page, uploaded on Mar. 18, 2015 by user Titus Group. Retrieved from Internet: <https://www.youtube.com/watch?v=HINht6yDzpM>.

International Search Report and the Written Opinion of the International Searching Authority, International Patent Application No. PCT/US2021/029845, pp. 1-14, dated Aug. 17, 2021.

International Search Report and the Written Opinion of the International Searching Authority, International Patent Application No. PCT/US2021/029352, pp. 1-16, dated Aug. 23, 2021.

* cited by examiner

MODULAR ACOUSTIC SYSTEMS

BACKGROUND

Aspects and implementations of the present disclosure are generally directed to modular audio systems, for example, audio systems which include a removable acoustic module.

SUMMARY OF THE DISCLOSURE

The present disclosure relates modular audio systems which include an acoustic module configured to be removably engaged with a head-worn peripheral device. In some examples, the head-worn peripheral device is a pair of eyeglass frames and the acoustic module is configured to removably secure to a socket arranged on the inside face of the temples of the eyeglasses. The acoustic module can slidingly, pivotably, and/or magnetically engage with the socket such that, when secured, the acoustic module is configured to generate acoustic energy in the form of audible sound proximate a user's ear while the user is wearing the head-worn peripheral device. In some examples, the acoustic module is configured to removably secure to any portion of the head-worn peripheral device, e.g., on the temples of the eyeglass frames. In other examples, the temples of the head-worn peripheral device are configured to slidingly engage with a sleeve, where the sleeve includes a pocket configured to slidingly engage with the acoustic module.

In one example, a removable acoustic module is provided, the acoustic module including an acoustic module housing configured to removably engage with a head-worn peripheral device, wherein at least a portion the head-worn peripheral device is formed about a substantial portion of the acoustic module housing such that, when engaged with the head-worn peripheral device the removable acoustic module is arranged to provide acoustic energy proximate a user's ear, and first circuitry arranged within the acoustic module housing, the first circuitry comprising acoustic circuitry and an acoustic transducer, the acoustic circuitry arranged to produce a first electrical signal, the first electrical signal utilized by the acoustic transducer to produce the acoustic energy proximate the user's ear.

In an aspect, the acoustic module housing is arranged to pivotably or magnetically couple to the head-worn peripheral device.

In an aspect, if the acoustic module housing is arranged to magnetically couple to the removable acoustic module, the acoustic module further comprises a magnet arranged on or within the acoustic module housing and the head-worn peripheral device comprises a complementary magnet or magnetic plate arranged on or within the head-worn peripheral device such that the magnetic engagement between the magnet and the complementary magnet or magnetic plate allows the acoustic module housing to pivot with respect to the head-worn peripheral device.

In an aspect, the acoustic module housing further comprises a metallic component arranged within the acoustic module housing to magnetically insulate or shield the acoustic transducer from a first magnetic field generated by the first alignment magnet or the second alignment magnet.

In an aspect, the metallic component is a first antenna electrically connected to the first circuitry of the acoustic module, wherein the metallic component is configured to transmit wireless data to or receive wireless data from a second antenna arranged within the head-worn peripheral device.

In an aspect, the metallic component is configured to increase a magnitude of the first magnetic field of the first magnet or the second magnet.

In an aspect, the acoustic module housing is arranged to slide or translate with respect to the head-worn peripheral device.

In an aspect, the removable acoustic module is configured to establish a connection with the head-worn peripheral device, wherein the connection is a wireless data connection, a wireless power connection, a physical data connection, or a physical power connection In an aspect, the physical data connection or the physical power connection utilizes a two-pin connector interface.

In an aspect, the head-worn peripheral device comprises a wearable eyeglass form-factor, the wearable eyeglass form-factor comprising the temple, the temple having an inside face, an outside face, a top surface and a bottom surface, and wherein the inside face is arranged to receive the removable acoustic module.

In an aspect, the inside face of the temple further includes the socket arranged to receive and removably engage with the removable acoustic module.

In an aspect, the socket further configured to removably disengage with the socket by utilizing a pivoting motion, a rotating motion, a see-saw motion, a spring-loaded hinge, a slide-button release, a sliding engagement, or a friction fit engagement.

In an aspect, the acoustic module housing is further configured to removably engage with the head-worn peripheral device via at least one fastening arrangement, wherein the at least one fastening arrangement is selected from: a friction fit, a screw, a bolt, a hook-and-loop fastening arrangement, a suction cup arrangement, a press fastening arrangement, a press-and-seal fastening arrangement, a slide-button release mechanism, a frictional insert arrangement, a dual-frictional insert arrangement, a wrapping frictional projection arrangement, a frictional pinch arrangement, or a conductive sliding-rail arrangement.

In an aspect, the first circuitry is arranged to receive a first power signal from a battery, wherein the battery is arranged within the removable acoustic module housing or, on or in the head-worn peripheral device.

In an aspect, the first circuitry comprises a first antenna arranged within the acoustic module housing, the first antenna configured to receive a wireless signal from a second antenna arranged on or in the head-worn peripheral device, or an additional peripheral device.

In an aspect, the acoustic module also includes a sensor configured to communicate with the first circuitry of the removable acoustic module or second circuitry of the head-worn peripheral device, wherein the sensor is arranged on or in the acoustic module housing, or, on or in the head-worn peripheral device.

In an aspect, the sensor is a microphone and wherein the microphone is arranged on or within the acoustic module housing or on or within the head-worn peripheral device.

In an aspect, the sensor is selected from: a gyroscope, an accelerometer, a magnetometer, a force sensor, an ultrasonic sensor, a pressure sensor, a proximity sensor, a Light Detection and Ranging (LIDAR) sensor, a temperature sensor, a humidity sensor, an ambient light sensor, an Ultra-Violet (UV) sensor, a daylight sensor, a button, or a touch-capacitive sensor.

In an aspect, the acoustic module housing further includes a first port and a second port, wherein the first port is arranged proximate the user's ear on a first surface of the acoustic module housing and the second port is arranged on a second surface of the acoustic module housing.

In an aspect, the head-worn peripheral device is selected from: a hat, a visor, a helmet, a ski-helmet, a pair of ski-goggles, or a headband.

In another example, a head-worn peripheral device is provided, the head-worn peripheral device configured to receive an acoustic module housing of a removable acoustic module, such that the removable acoustic module is configured to provide acoustic energy proximate a user's ear via first circuitry arranged within the acoustic module housing, the first circuitry comprising an acoustic circuitry and an acoustic transducer, the acoustic circuitry arranged to produce a first electrical signal, the first electrical signal utilized by the acoustic transducer to produce the acoustic energy proximate the user's ear, wherein the removable acoustic module includes a first protrusion configured to frictionally engage with an at least one side or surface of the temple; or wherein the acoustic module includes a first protrusion configured to be inserted within at least one side or surface of the temple of the head-worn peripheral device wherein the first protrusion does not include electrical contacts.

In another example, a modular audio system is provided, the modular audio system including a head-worn peripheral device configured to connect with a removable acoustic module the head-worn peripheral device comprising a sleeve, the sleeve configured to receive the acoustic module and a removable acoustic module. The removable acoustic module includes an acoustic module housing configured to removably engage with the pocket of the head-worn peripheral device such that, when engaged with the head-worn peripheral device the removable acoustic module is arranged to provide acoustic energy proximate a user's ear, and first circuitry arranged within the acoustic module housing, the first circuitry comprising acoustic circuitry and an acoustic transducer, the acoustic circuitry arranged to produce a first electrical signal, the first electrical signal utilized by the acoustic transducer to produce the acoustic energy proximate the user's ear.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure relates to modular audio systems which include an acoustic module configured to be removably engaged with a head-worn peripheral device. In some examples, the head-worn peripheral device is a pair of eyeglass frames and the acoustic module is configured to removably secure to a socket arranged on the inside face of the temples of the eyeglasses. The acoustic module can slidingly, pivotably, and/or magnetically engage with the socket such that, when secured, the acoustic module is configured to generate acoustic energy in the form of audible sound proximate a user's ear while the user is wearing the head-worn peripheral device. In some examples, the acoustic module is configured to removably secure to any portion of the head-worn peripheral device, e.g., on the temples of the eyeglass frames. In other examples, the temples of the head-worn peripheral device are configured to slidingly engage with a sleeve, where the sleeve includes a pocket configured to slidingly engage with the acoustic module.

Figure 1:
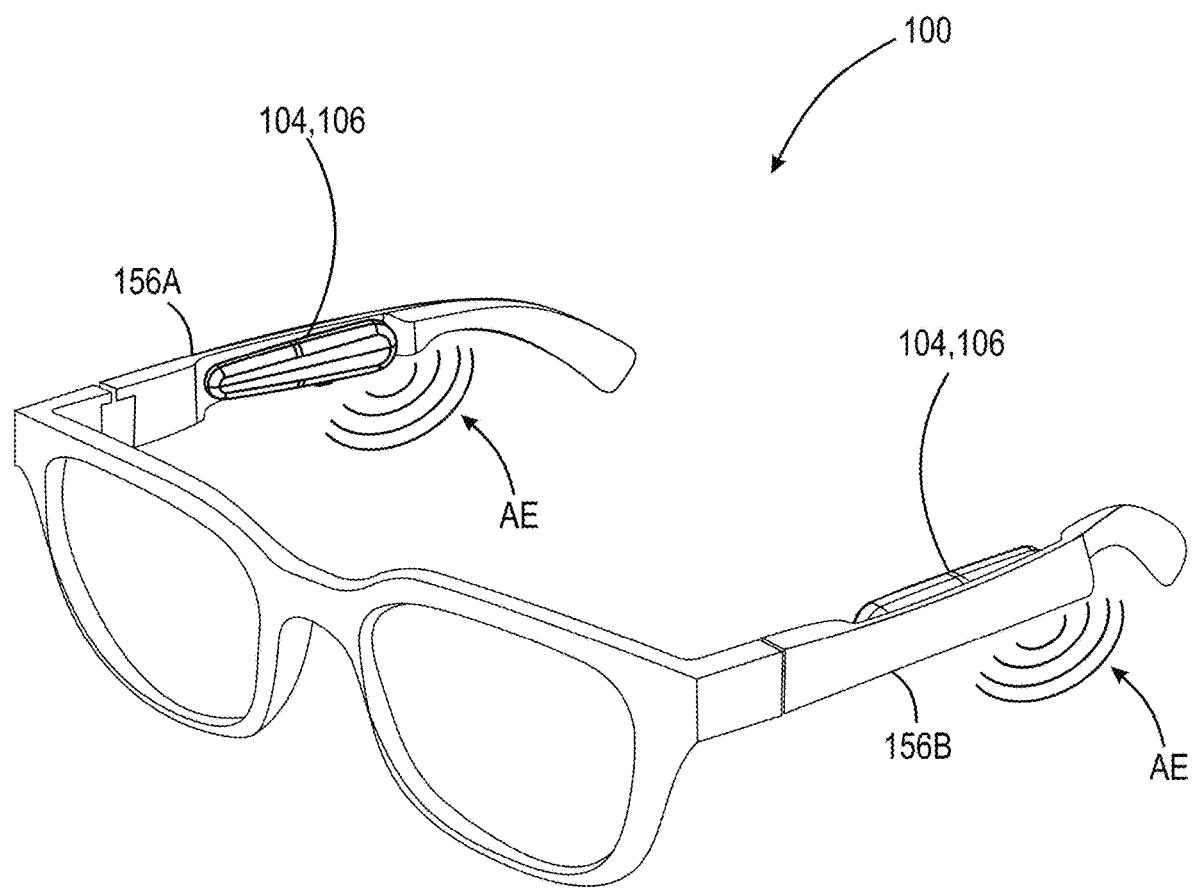
FIG. 1 is a schematic perspective view of a modular audio system according to the present disclosure.

The term "wearable audio device", as used in this application, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes acoustic circuitry to transduce audio signals to acoustic energy. The acoustic circuitry may be housed in an earcup. While some of the figures and descriptions following may show a single wearable audio device, having a pair of earcups (each including an acoustic transducer) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic transducer in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 1 shows an example of an audio eyeglasses form factor, in other examples the headset may be an in-ear, on-ear, around-ear, or near-ear headset. In some examples, a wearable audio device may be an open-ear device that includes an acoustic transducer to radiate acoustic energy towards the ear while leaving the ear open to its environment and surroundings.

The following description should be read in view of FIGS. 1-16. FIG. 1 is a schematic view of modular audio system 100 according to the present disclosure. Modular audio system 100 includes a head-worn peripheral device 102 and at least one removable acoustic module 104. Head-worn peripheral device 102 is intended to be a device configured to attach to or contact a user's head and contact or engage with acoustic module 104 (discussed below). In one example, the head-worn peripheral device 102 is a pair of eyeglasses, i.e., an eyeglass form factor, configured to receive at least one acoustic module 104. In other examples, head-worn peripheral device 104 is a pair of safety glasses, a hat, a headband, a hood, a helmet, a visor, a pair of goggles, e.g., ski goggles, an open audio device worn on the head, shoulders, or neck, or any other device worn on or in proximity to a user's head or neck. Although some examples illustrated in the figures that follow only show one side or one perspective view of half of a head-worn peripheral device 102, it should be appreciated that the other sides of each example illustrated can include similar structure as well as a second acoustic module 104 (e.g., as shown in FIGS. 1 and 7) so that the acoustic energy AE produced by each acoustic module 104 can be provided to both a user's left ear and the user's right ear. Head-worn peripheral device 102 will be described in more detail below with respect to FIGS. 7-16. Acoustic module 104 is intended to be a device configured to generate or render acoustic energy AE (shown in FIG. 1), i.e., audible sound, proximate a user's ear E (shown in FIG. 15). In some examples, as illustrated in FIGS. 1, 7, and 8A-16, acoustic module 104 is configured to generate acoustic energy AE proximate to user's ear E, but not configured to contact user's ear E while generating the acoustic energy AE. In other words, acoustic module 104 is an open-ear acoustic module, configured to generate acoustic energy AE outside of the user's ear canal and direct acoustic energy AE toward the user's ear canal.

As illustrated in FIGS. 2-5B, acoustic module 104 includes an acoustic module housing 106. Acoustic module housing 106 is configured to at least partially encompass or surround the internal circuitry utilized to operate acoustic module 104, e.g., first circuitry 120 (discussed below). It should be appreciated that acoustic module housing 106 can be made from plastic materials, e.g., Polyethylene Terephthalate (PET), High-Density Polyethylene (HDPE), Low-Density Polyethylene (LDPE), Polyvinyl Chloride (PVC), Polypropylene (PP), Polystyrene (PS) or any other formable polymer. Additionally, in some examples, acoustic module housing 106 is made from metal, e.g., steel, aluminum, or other ferrous metals. In some embodiments, as will be discussed below, acoustic module housing 106 may be removably secured to head-worn peripheral device via magnetic attraction. In those examples it should be appreciated that some or all of the acoustic module housing can be made from a ferrous metal to shield the internal electronic components (discussed below) from interferences with the magnetic fields created. Acoustic module housing 106 includes a top side 108, a bottom side 110, a first side surface 112, and a second side surface 114. Additionally, as illustrated in FIGS. 2-5B, acoustic module housing 106 also includes first end FE and second end SE.

In one example, acoustic module housing 106 includes two acoustic ports, i.e., first port 116 and second port 118, configured to allow acoustic energy AE to propagate out of the interior of acoustic module housing 106, into the air, and into the ear E of user U. First port 116 may be acoustically coupled to a front side of an acoustic transducer internal to the housing, and second port 118 may be acoustically coupled to a rear side of the acoustic transducer. As shown in FIGS. 2-5B, first port 116 is located proximate first end FE of acoustic module housing 106 and is configured such that, when acoustic module 104 is engaged with or in contact with head-worn peripheral device 102, first port 116 is configured to direct acoustic energy AE directly to ear E of user U. In other words, first port 116 is configured to direct acoustic energy AE from first port 116 to the ear canal of the ear E of user U where acoustic energy AE can propagate unimpeded to the ear canal of user U. Similarly, second port 118 is located proximate first end FE of acoustic module housing 106 and is further configured such that, when acoustic module 104 is engaged with or in contact with head-worn peripheral device 102, second port 118 is configured to direct acoustic energy AE away from ear E of user U. In one example, the size and positioning of each port, i.e., first port 116 and second port 118, can create two sources of acoustic energy AE outside of acoustic module housing 106. The two sources of acoustic energy AE, being in proximity to each other, creates an acoustic dipole to aid in the generation of acoustic energy AE that is perceived by the ears of user U. Although two ports are shown, there may be additional ports (i.e., more than one port acoustically coupled to the front side of an acoustic transducer and/or more than one port acoustically coupled to the rear side of the acoustic transducer). Proper acoustic tuning of the ports may be achieved through sizing of the ports and/or use of acoustic resistance material at the port openings. In addition, a screen may be used to prevent the ingress of particles such as dust or moisture into the ports.

Figure 6A:
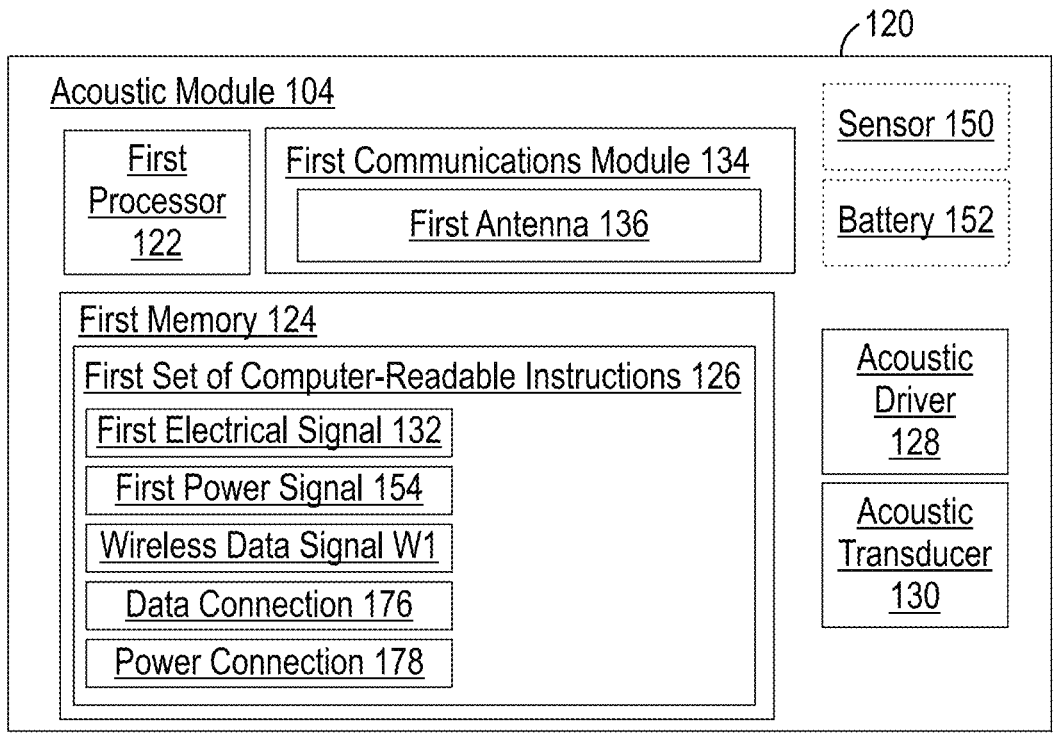
FIG. 6A is a schematic view of the internal components of an acoustic module according to the present disclosure.
Figure 7:
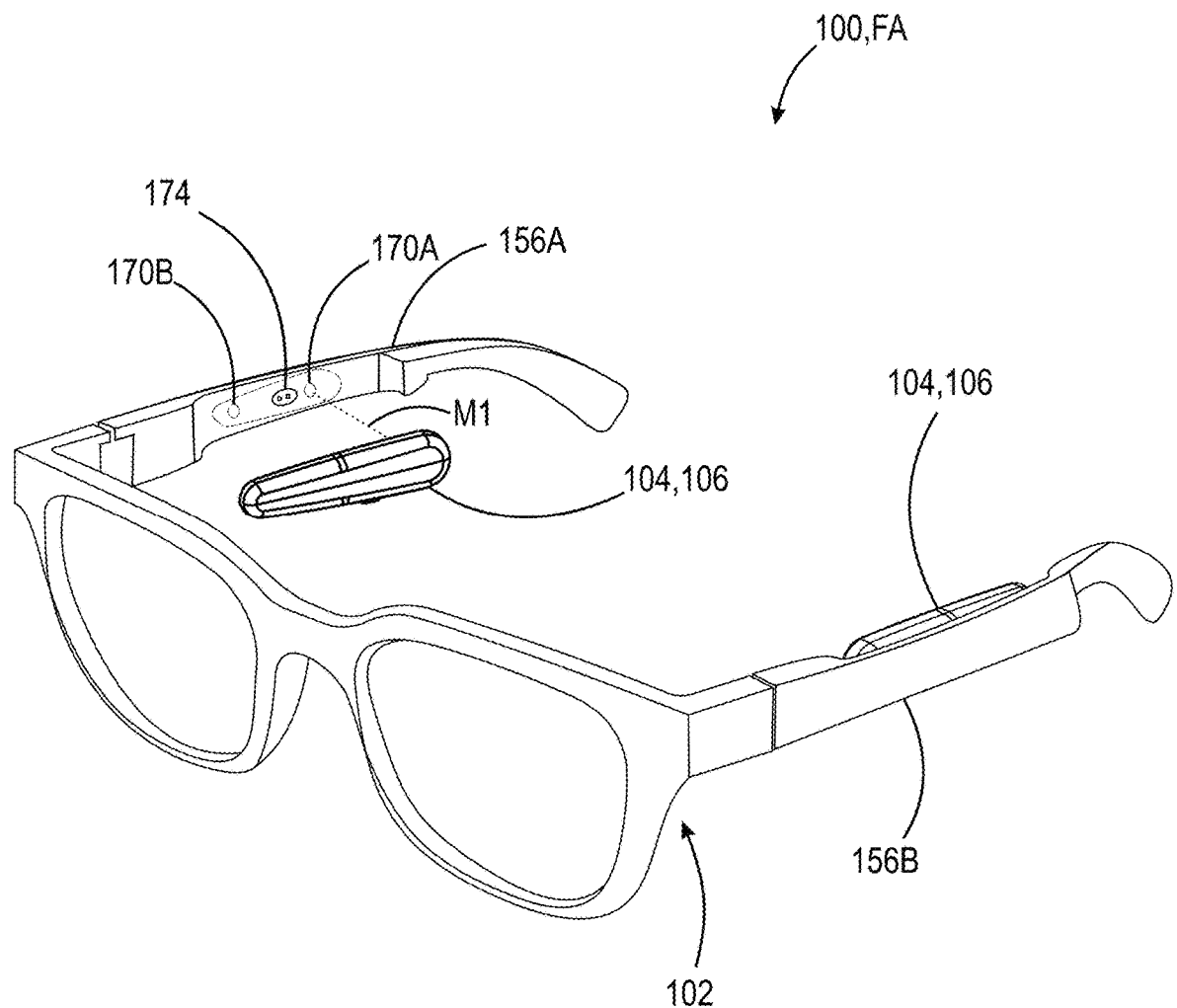
FIG. 7 is a schematic, partially exploded, perspective view of a modular audio system according to the present disclosure.

As illustrated in FIG. 6A, first circuitry 120 is provided within acoustic module housing 106 of acoustic module 104. First circuitry 120 includes a first processor 122 and a first memory 124 arranged to execute and store, respectively, a first plurality of non-transitory computer-readable instructions 126 to perform the various functions of first circuitry 120 and acoustic module 104 as discussed herein. First circuitry 120 also includes acoustic circuitry 128 electrically connected to an acoustic transducer 130. Acoustic circuitry 128 is intended to be a circuit, a plurality of circuits, or a plurality of electrical components configured to receive electrical power from, e.g., a battery or other power source (discussed below), and convert the electrical power into an electrical signal, e.g., first electrical signal 132 (discussed below), or a series of discrete electrical signals, which are received by acoustic transducer 130 and converted into mechanical energy. Acoustic transducer 130 is intended to be a component or series of components, which converts an electrical signal, e.g., first electrical signal 132, into mechanical energy, such that the mechanical energy disturbs the surrounding air to create waves, e.g., sound waves. In one example, first memory 124 includes a plurality of music or audio files. Acoustic circuitry 128 can generate at least one electrical signal, i.e., first electrical signal 132, where first electrical signal 132, corresponds to at least a portion of one music or audio file of the plurality of music or audio files stored in first memory 124, and provide first electrical signal 132 to acoustic transducer 130. Acoustic transducer 130 then operates to generate discrete sound waves within acoustic housing 106 which are allowed to propagate outside acoustic module housing 106 via first port 116 and/or second port 118, potentially forming an acoustic dipole, such that the acoustic energy AE produced can propagate to the ear E of user U.

First circuitry 120 can also include a first communications module 134 configured to send and/or receive data. First communications module 134 can also include first antenna 136 configured to send and/or receive a wireless signal W1, e.g., wireless data over a wireless protocol, where the wireless protocol is selected from at least one of: a Bluetooth protocol, a Bluetooth Low-Energy (BLE) protocol, a ZigBee protocol, a Wi-Fi (IEEE 802.11) protocol, iPod Accessory Protocol (iAP), Radio Frequency Communication (RFCOMM), Near-field Magnetic Induction (NFMI), Near-Field Electromagnetic Induction (NFEMI) or any other wireless protocol for establishing a wireless communication connection between acoustic module 104 and another wireless device, e.g., a personal computer (PC), smartphone, tablet, or smart watch. In some examples, as will be described below, first communications module 134 may utilize first antenna 136 to establish a wireless data communication connection with head-worn peripheral device 102. It should also be appreciated that first antenna 136 can also send and/or receive wireless signals with additional peripheral devices, e.g., personal computers (PCs), smart phones, tablets, smart watches, etc.

First communications module 134 can also be configured to send and/or receive data via a wired connection. For example, first communications module 134 may include a data port configured to receive data via a cable or other physical data connection, such that, e.g., the plurality of music or audio files described above may be stored in first memory 124 of acoustic module 104 before, during, or after engaging acoustic module 104 with head-worn peripheral device 102.

Figure 6B:
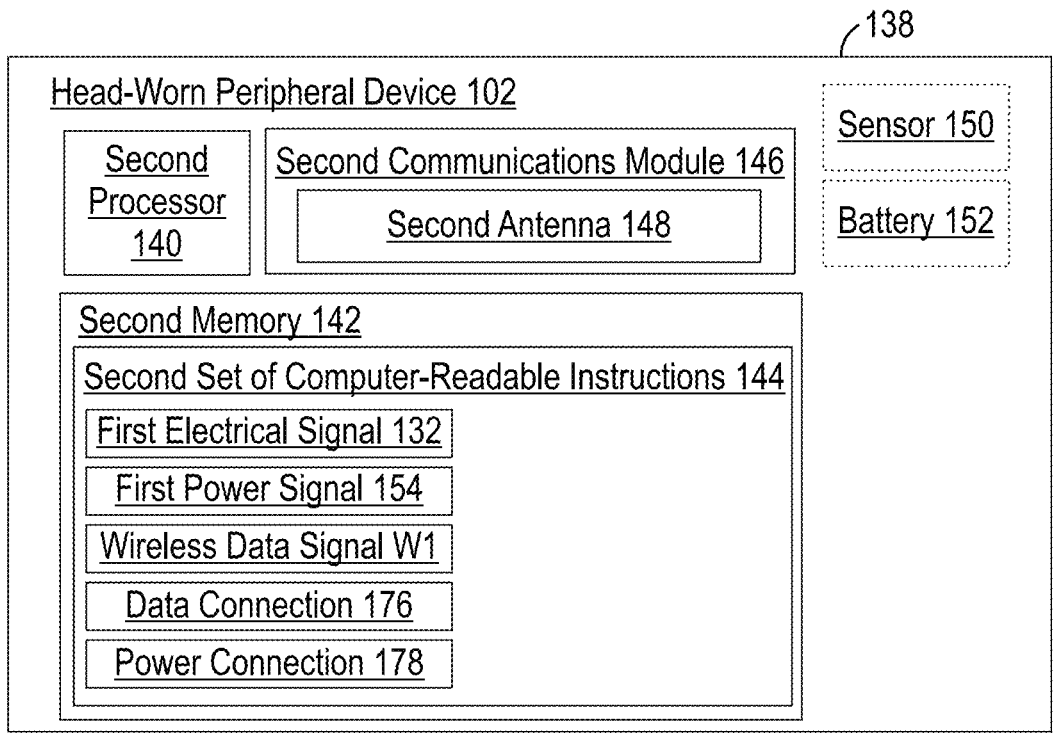
FIG. 6B is a schematic view of the internal components of a head-worn peripheral device according to the present disclosure.

In some examples, as illustrated in FIG. 6B, head-worn peripheral device 102 can include similar circuitry, e.g., second circuitry 138. Second circuitry 138 includes a second processor 140 and a second memory 142 arranged to execute and store, respectively, a second plurality of non-transitory computer-readable instructions 144 to perform the various functions of second circuitry 138 and head-worn peripheral device 102 as discussed herein. Second circuitry 138 can also include a second communications module 146 configured to send and/or receive data. Second communications module 146 can also include second antenna 148 configured to send and/or receive wireless data over a wireless protocol, where the wireless protocol is selected from at least one of: a Bluetooth protocol, a Bluetooth Low-Energy (BLE) protocol, a ZigBee protocol, a Wi-Fi (IEEE 802.11) protocol, iPod Accessory Protocol (iAP), Radio Frequency Communication (RFCOMM), Near-field Magnetic Induction (NFMI), Near-Field Electromagnetic Induction (NFEMI) or any other wireless protocol for establishing a wireless communication connection between head-worn peripheral device 102 and another wireless device, e.g., a personal computer (PC), smartphone, tablet, or smart watch. In some examples, as will be described below, second communications module 146 may utilize second antenna 146 to establish a wireless data communication connection with acoustic module 104.

Second communications module 146 can also be configured to send and/or receive data via a wired connection. For example, second communications module 146 may include a data port configured to receive data via a cable or other physical data connection, such that, e.g., the plurality of music or audio files described above may be stored in second memory 142 of head-worn peripheral device 102 before, during, or after engaging with acoustic module 104.

Modular audio system 100 also includes at least one sensor 150. The at least one sensor 150 can be selected from: a button, a touch-capacitive sensor or surface, a gyroscope, an accelerometer, a magnetometer, a microphone, an ultra-violet (UV) light sensor, an infrared (IR) sensor, a daylight sensor, or a camera. It should be appreciated that one or more of these types of sensors can be combined in any conceivable way, e.g., a gyroscope, an accelerometer, and a magnetometer may be provided as a single inertial measurement unit (IMU). As will be discussed below in detail, and as illustrated in FIGS. 6A-6B, sensor 150 can be located on, in, or in communication with either head-worn peripheral device 102 or acoustic module 104. As illustrated in FIGS. 6A-6B dotted lines illustrate an optional component, e.g., sensor 150 can be electrically connected to either first circuitry 120 or second circuitry 138. It should be appreciated that sensor 150 can be configured to receive a user input, e.g., a mechanical input, a gesture, a voice command, etc., and provide that user input to first circuitry 120 or second circuitry 138. Additionally, modular audio system 100 includes at least one battery 152. Similar to sensor 150 discussed above, battery 152 can optionally be connected to first circuitry 120 and/or second circuitry 138. It should be appreciated that battery 152 can be a lithium-ion battery, a capacitor, super-capacitor, or other power supply, and can be located on, in, or in communication with either head-worn-peripheral device 102 or acoustic module 104. In other words, battery 152 is configured to provide a power signal, i.e., power signal 154 to head-worn peripheral device 102 or acoustic module 104 during operation.

In some examples, as illustrated in FIGS. 1 and 7-16, head-worn peripheral device 102 has an eyeglass form factor which includes a plurality of temples 156A-156B (collectively referred to as "temples 156"). Each temple 156 includes an inside face 158, an outside face 160, a top surface 162, and a bottom surface 164. Additionally, each temple of temples 156 may also include a hinge which pivotably secures each temple to the front of the frame, i.e., the portion of the frames which include the lenses and nose bridge. As will be discussed below in detail, in some examples, the inside face 158 of each temple 156 can include a socket 166 configured to removably engage with acoustic module 104. In some examples, socket 166 is a depression within or beneath the planar surface of inside face 158. In other examples, socket 166 is a protrusion, e.g., a protruding ridge projected away from inside face 158 and configured to have a complementary shape to the shape of acoustic module housing 106 such that when engaged, the ridge encompasses a substantial portion of acoustic module housing 106 via a friction fit. In some examples, at least a portion of each temple 156 is formed about a substantial portion of acoustic module housing 106 such that when the head-worn peripheral device 102 is positioned on a user's head a space is formed between the side of the user's head and the inside face 158 so that acoustic module 104 can be engaged and not contact or rub against the user's head. As illustrated in FIGS. 7-14B, temple 156A is formed with a sloping recessed portion, i.e., a portion slopping away from the user's head, where the sloping recessed portion is arranged on each temple 156 between the hinge and the portion of the temple that contacts and rests upon the user's ear. Additionally, as illustrated in FIGS. 11A-14B, acoustic module 104 may be removably secured to the outside surface 160, the top surface 162, and/or the bottom surface 164 of temple 156A using any of the fastening arrangements FA described below. It should also be appreciated that, in some examples, each temple 156 may include a planar surface, e.g., a surface that is substantially flat. In these examples, the acoustic module 104 may be removably secured to the planar surface in any one of the fastening arrangements FA discussed below and extend the footprint of the temple 156 accordingly.

As will be described below in detail, modular audio system 100 includes a plurality of fastening arrangements FA which detail how acoustic module 104 may be removably secured, engaged, or otherwise attached to the temples 156A-156B of head-worn peripheral device 102. Thus, the following example descriptions should be read in view of FIGS. 2-5B and 7-14B.

Figure 2:
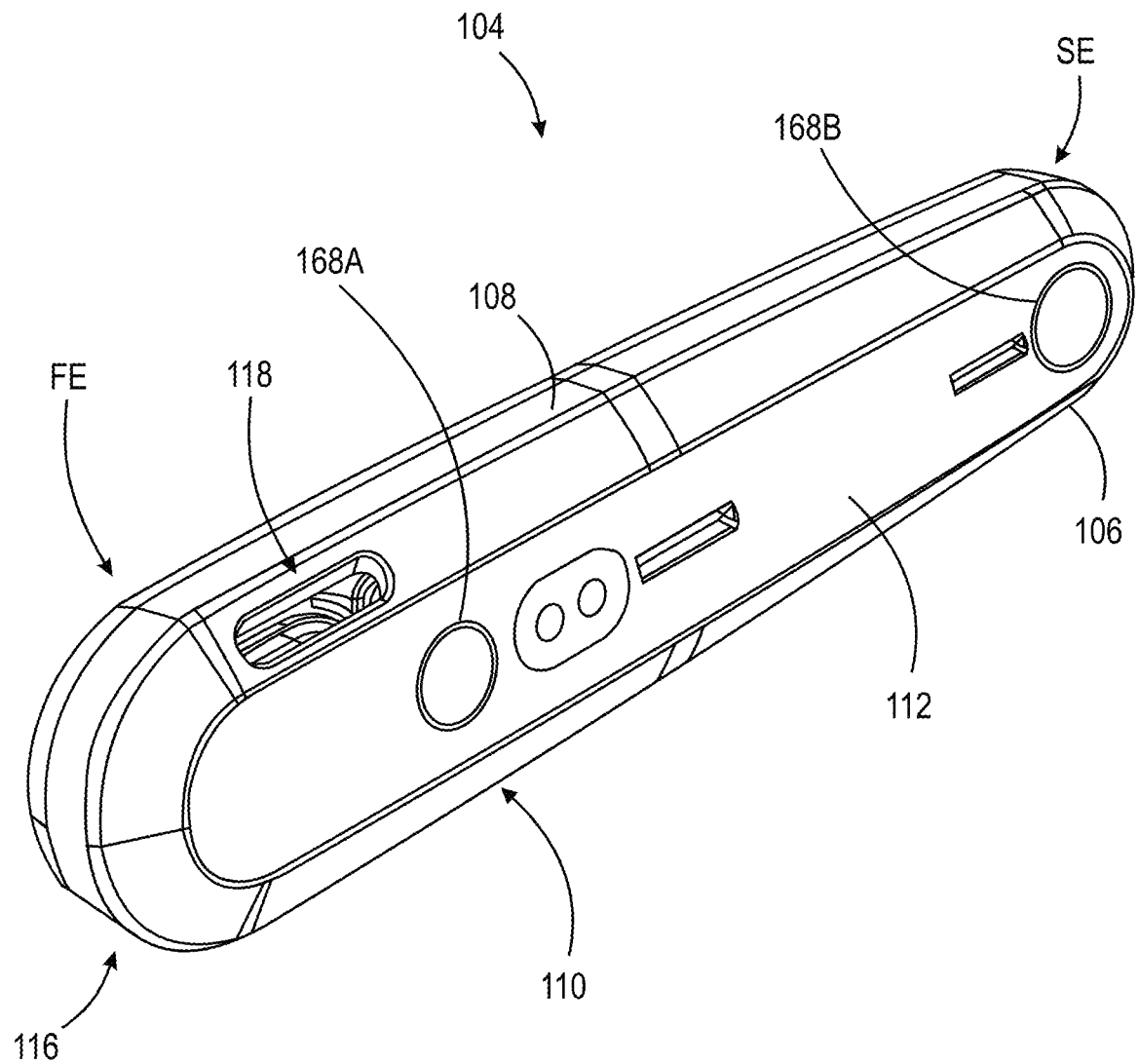
FIG. 2 is right-side perspective view of an acoustic module according to the present disclosure.
Figure 3:
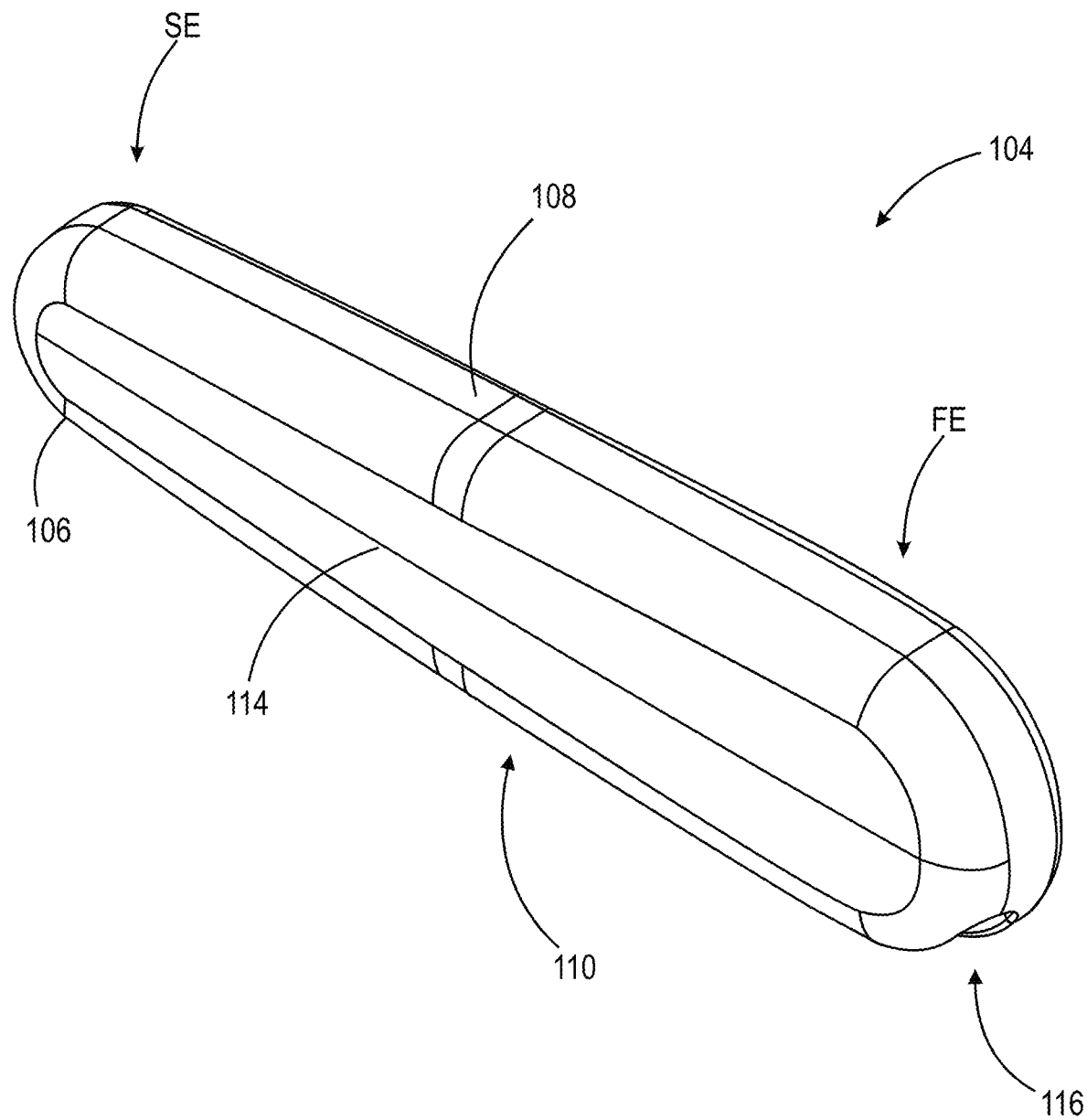
FIG. 3 is left-side perspective view of an acoustic module according to the present disclosure.
Figure 4A:
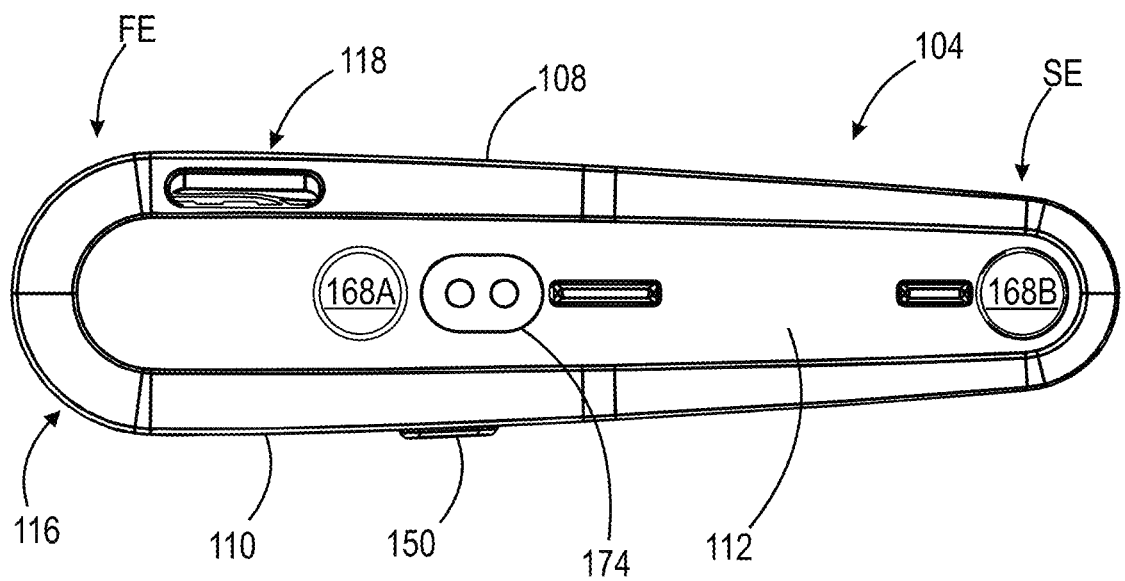
FIG. 4A is right-side elevational view of an acoustic module according to the present disclosure.
Figure 4B:
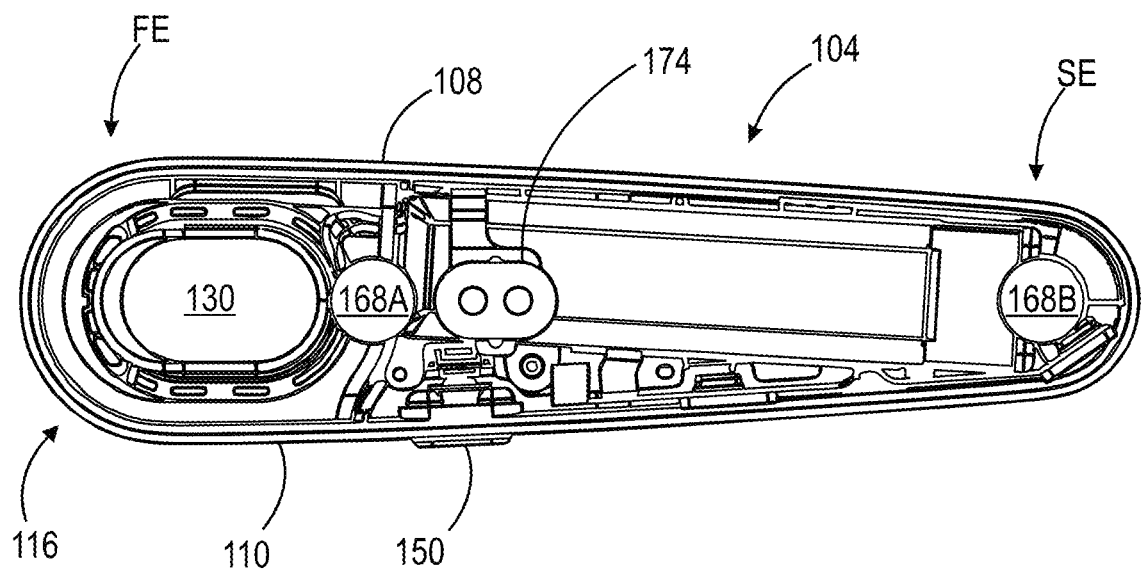
FIG. 4B is right-side elevational view of an acoustic module with the housing partially removed according to the present disclosure.

For example, As illustrated in FIGS. 2, 4A-4B, and 7, one example fastening arrangement FA includes magnetic fastening between acoustic module housing 106 and head-worn peripheral device 102. Accordingly, acoustic module 104 can include a plurality of magnets, e.g., first magnet 168A and second magnet 168B, configured to magnetically secure acoustic module housing 106 to one of the temples 156 of head-worn peripheral device 102. As illustrated in FIGS. 2 and 4A-4B, first magnet 168A is intended to be located proximate first end FE of acoustic module housing 106 and second magnet 168B is intended to be located proximate second end SE of acoustic module housing 106. In one example, illustrated in FIG. 7, inside face 158 of each of the temples 156 of head-worn peripheral device 102 include a plurality of complementary magnets 170A-170B, e.g., first complementary magnet 170A and second complementary magnet 170B, configured to engage with each of the first magnet 168A and the second magnet 168B of acoustic module housing 106, respectively. Alternatively, the inside face 158 of each temple 156 may include a plate or other objected capable of magnetically coupling with first magnet 168A and second magnet 168B of acoustic module housing 106. In one example, only one magnetic pair is provided, e.g., first magnet 168A, located proximate first end FE of the acoustic module housing 106, and first complementary magnet 170A on the inside face of temple 156. In this arrangement, a user may bring first end FE of acoustic module housing 106 close to, e.g., first temple 156A and allow the magnetic attraction between first magnet 168A and first complementary magnet 170A to engage acoustic module housing 106 with inside face 158 of temple 156A, and the user can pivot or rotate second end SE of acoustic module housing 106 into the position illustrated in FIG. 1 to secure it via, e.g., friction fit with socket 166. It should be appreciated that in some examples, first magnet 168A, in addition to providing magnetic coupling between acoustic module housing 106 and head-won peripheral device 102, can also be a part of the components used to generate acoustic energy AE using acoustic transducer 130. For example, acoustic transducer 130 may include a magnet and electromagnetic coil configured to generate an alternative magnetic field which creates acoustic energy AE. In these examples, first magnet 168A, in addition to providing magnetic coupling between the acoustic module housing 106 and the head-worn peripheral device 102, can also function as the magnet of acoustic transducer 130. Additionally, in examples where sensor 150 is a magnetometer, the existence of the first magnetic field M1 between, e.g., first magnet 168A and first complementary magnet 170A can be used by the magnetometer to sense or otherwise determine that the acoustic module 104 is successfully secured to head-worn peripheral device 102.

Figure 5A:
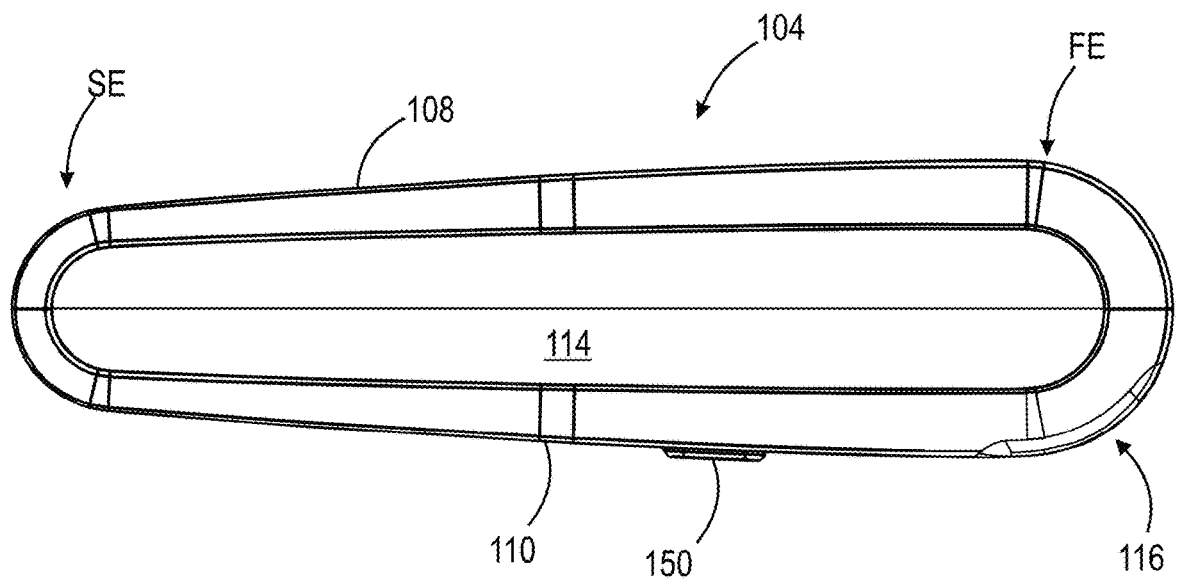
FIG. 5A is left-side elevational view of an acoustic module according to the present disclosure.
Figure 5B:
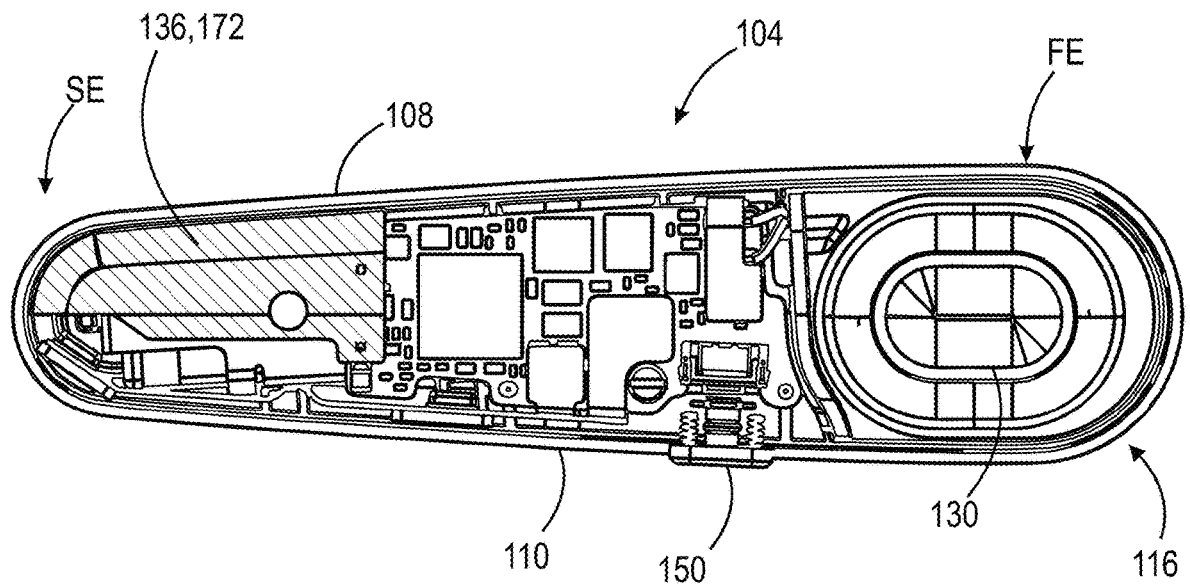
FIG. 5B is left-side elevational view of an acoustic module with the housing partially removed according to the present disclosure.

The magnets discussed above are configured to generate respective magnetic fields which form the magnetic attraction between, e.g., the acoustic module housing 106 and the inside face 158 of temple 156A. In one example, a magnetic field is generated between second magnet 168B and second complementary magnet 170B, i.e., first magnetic field M1 (shown in FIG. 7). As illustrated in FIG. 5B, it should be appreciated that acoustic module 104 can include a metallic component 172 configured to provide magnetic shielding between the magnets of the acoustic module housing 106 or the complementary magnets of the head-worn peripheral device 102. Additionally, in some examples, metallic component 172 is also configured to act as an antenna for first circuitry 120, e.g., first antenna 136 (discussed above). In other words, not only does metallic component 172 provide magnetic shielding of first circuitry 120 from, e.g., second magnet 168B and/or second complementary magnetic 170B, it also functions as first antenna 136. It should be appreciated that any magnetic shielding provided by metallic component 172 can be provided in addition to any magnetic shielding provided by the metallic acoustic module housing 106. Furthermore, in some examples, metallic component 172 is made of a ferromagnetic material and configured to increase a magnitude of the first magnetic field M1, between, e.g., second magnet 168B and acoustic module housing 106.

FIG. 7 illustrates a magnetic fastening arrangement FA as described above. In addition to a magnetic fastening arrangement, FIG. 7 also illustrates that socket 166 on inside face 158 of temple 156A can include a two-pin connection interface 174. Two-pin connection interface 174 may include a first pin and a second pin configured to electrically connect first circuitry 120 of acoustic module 104 and second circuitry 138 of head-worn peripheral device 102. Across two-pin connection interface 174, modular audio system 100 can provide a power connection 176 and/or a data connection 178 (shown in FIGS. 6A-6B) between acoustic module 104 and head-worn peripheral device 102. In some examples, battery 152 may be provided within head-worn peripheral device 102 connected to second circuitry 138. Thus, two-pin connection interface 174 may provide an electrical connection between battery 152 and provide electrical power, e.g., first power signal 154 (discussed above) to first circuitry 120 of acoustic module 104. Conversely, should battery 152 be provided within acoustic module 104 connected to first circuitry 120, two-pin connection interface 174 may provide electrical power, e.g., first power signal 154 (discussed above) from battery 152 to second circuitry 138 of head-worn peripheral device 102. In other example embodiments, as will be described below, a battery 152 may be provided in both head-worn peripheral device 102 and acoustic module 104 and therefore, power generation and consumption may be distributed between both devices Similarly, in examples which require data to be communicated between, e.g., first communications module 134 of first circuitry 120 and second communications module 146 of second circuitry 138, two-pin connection interface 174 may provide a path for data to be transferred between the communication modules. As described above, it should be appreciated that the data could also be sent between each communication module wirelessly, e.g., via first antenna 136 and second antenna 148. It should be appreciated that the various functions described above may be distributed in any conceivable combination between first circuitry 120 of acoustic module 104 and second circuitry 138 of head-worn peripheral device 102. For example, power distribution may be distributed between discrete batteries located on or in both devices, sensing, via sensor 150 may be distributed between a sensor located on or in each device, and data processing and wired or wireless communications may be distributed between first circuitry 120 and second circuitry 138.

Figure 8A:
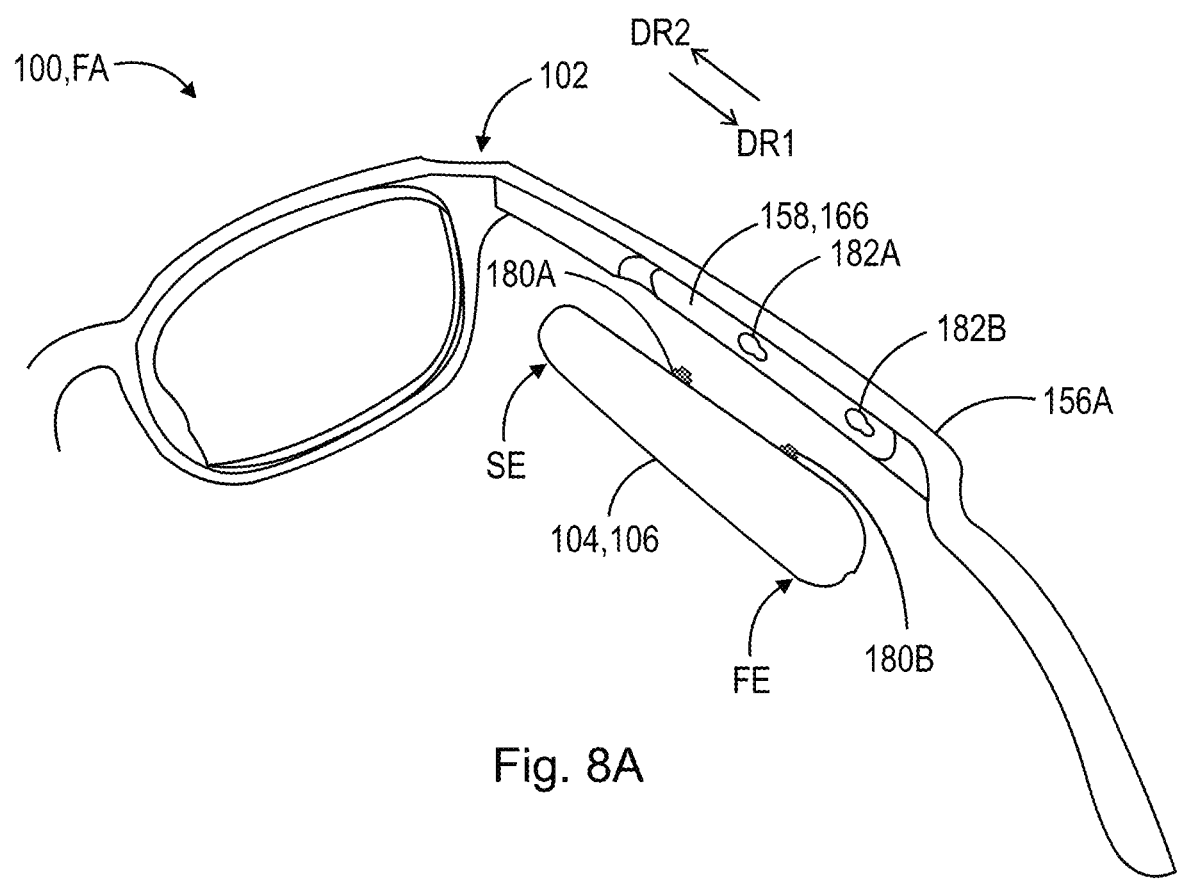
FIG. 8A is a schematic perspective view of a fastening arrangement according to the present disclosure.
Figure 8B:
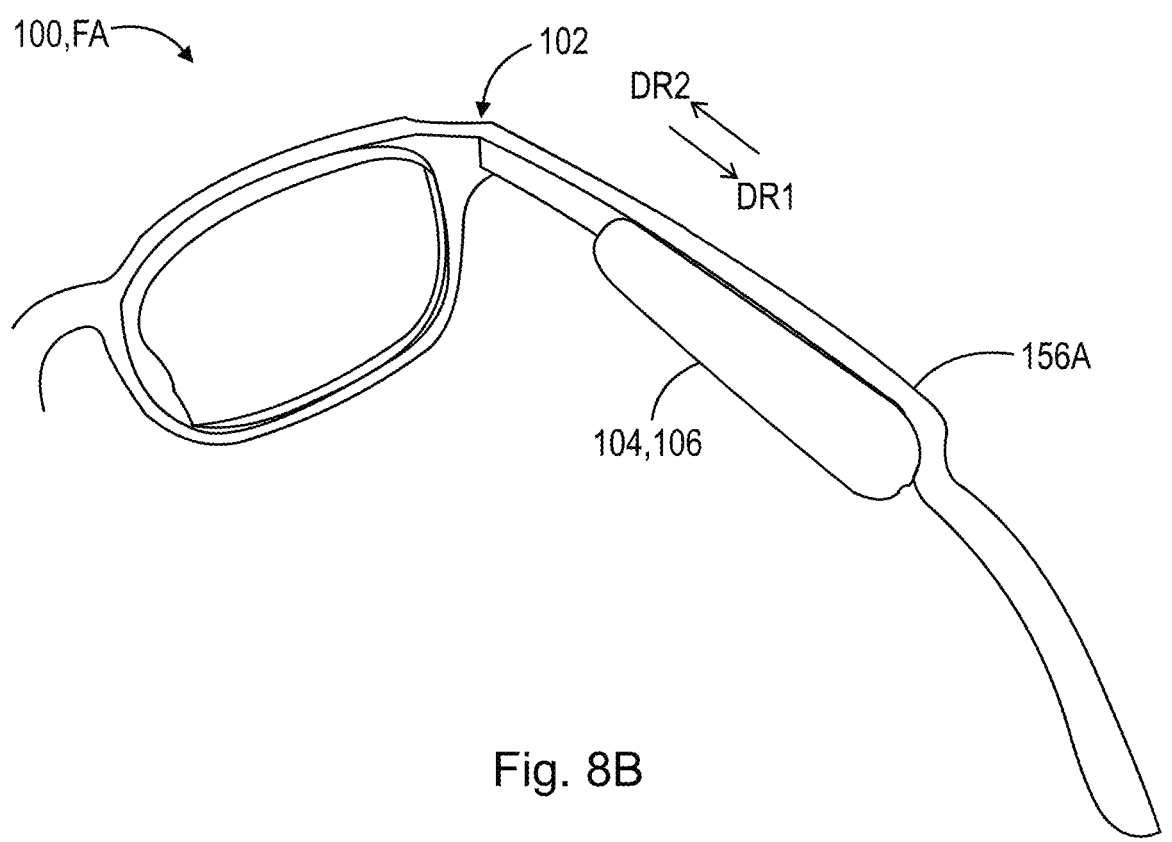
FIG. 8B is a schematic perspective view of a fastening arrangement according to the present disclosure.

FIGS. 8A-8B illustrate a fastening arrangement FA in the form of a slide engagement mechanism. As illustrated in FIG. 8A, inside face 158 of temple 156A may include a plurality of receiving recesses 182A-182B configured to receive a plurality of projections 180A-180B, respectively. For example, first projection 180A and second projection 180B are configured to be inserted into first receiving recess 182A and second receiving recess 182B. Thereafter, as illustrated in FIGS. 8A-8B, the user U can slide acoustic module housing 106 in first direction DR1 to frictionally secure acoustic module housing 106 within socket 166 on inside face 158 of temple 156A. It should be appreciated that a portion of each projection of plurality of projections 180A-180B can have a first diameter and a portion of each projection of plurality of projections 180A-180B can have a second diameter smaller than the first diameter. Similarly, a portion of each receiving recess of the plurality of receiving recesses 182A-182B can have a third diameter and a portion of each receiving recess of the plurality of receiving recesses 182A-182B can have a fourth diameter smaller than the third diameter. When initially inserted, the portion of each protrusion having the first diameter is configured to fit within the portion of each receiving recess having the third diameter. Upon sliding the acoustic module hosing 106 in first direction DR1, the portion of each protrusion having second diameter is configured to frictionally engage with the portion of each receiving recess having the fourth diameter securing the acoustic module 104 in place. To remove acoustic module housing 106 from inside face 158 of temple 156A, the user may apply a force in second direction DR2, opposite first direction DR1, disengaging the portion of each projection having the second diameter from the portion of each receiving recess having the fourth diameter and then the acoustic module 104 may be removed.

Figure 9A:
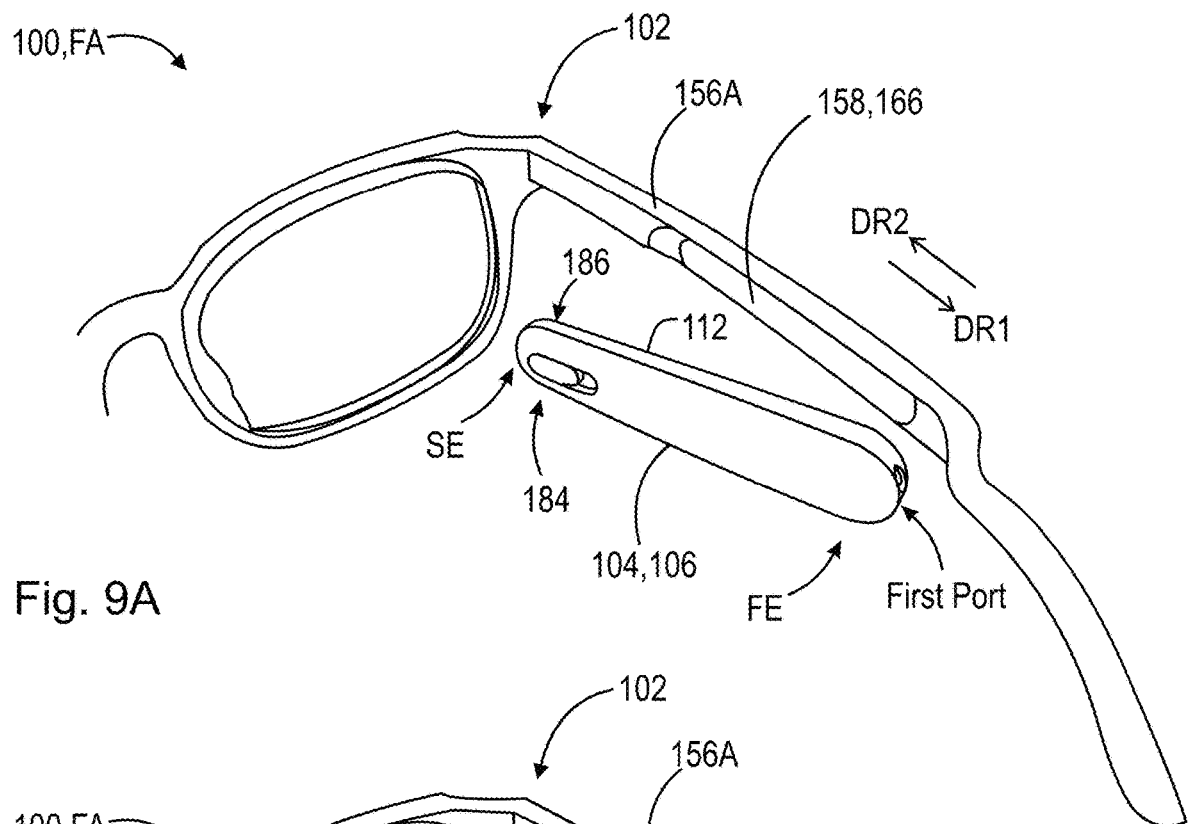
FIG. 9A is a schematic perspective view of a fastening arrangement according to the present disclosure.
Figure 9B:
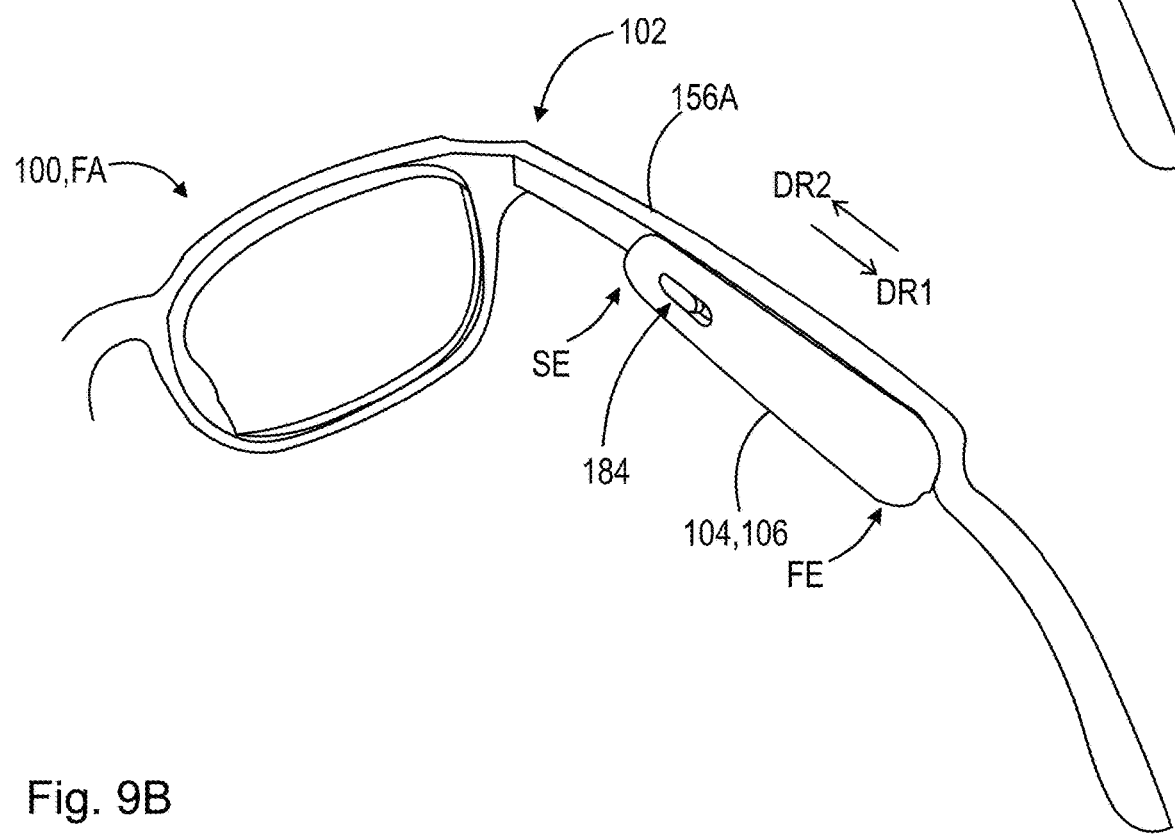
FIG. 9B is a schematic perspective view of a fastening arrangement according to the present disclosure.

FIGS. 9A-9B illustrate a fastening arrangement FA in the form of a slide-button release mechanism. As illustrated, first end FE of acoustic module housing 106 can be brought into contact with socket 166 on inside face 158 of temple 156A and may be secured via a physical connection, e.g., a lip or ridge that would engage with first end FE and prevent it from moving in first direction DR1, or may be secured via magnetic attraction, e.g., between first magnet 168A and first complementary magnet 170A (shown in FIGS. 2 and 7), such that first end FE is prevented from moving in first direction DR1. Additionally, second end SE of acoustic module housing 106 is configured to pivot into socket 166 and configured to engage with the inside of socket 166. It should be appreciated that second end SE can include a sliding latch 186 and slide-button release 184. Slide-button release 184 can be a spring-loaded slide-button release, e.g., a button slidably engaged within acoustic module housing 106 and spring biased in second direction DR2 opposite first direction DR1. Additionally, slide-button release 184 can be secured to sliding latch 186, where the sliding latch 186 is arranged on first side surface 112 proximate second end SE of the acoustic module housing 106, e.g., facing inside face 158 of temple 156A and within socket 166. The sliding latch 186 may include a projection or tab (not shown) configured to translate with slide-button release 184 and the projection or tab may be configured to engage with a ridge or lip of socket 166 and/or a hole, recess, or aperture (not shown) within inside face 158. The user U can use a finger to apply pressure to slide-button release 184 in first direction DR1. The motion of slide-button release 184 in direction DR1 corresponds to an equivalent or complementary translational motion of the slide latch 186 in direction DR1, releasing second end SE from engagement with socket 166. From there, first end FE of the acoustic module housing 106 can be pivoted out of contact with socket 166 and the entire housing can be removed.

Figure 10A:
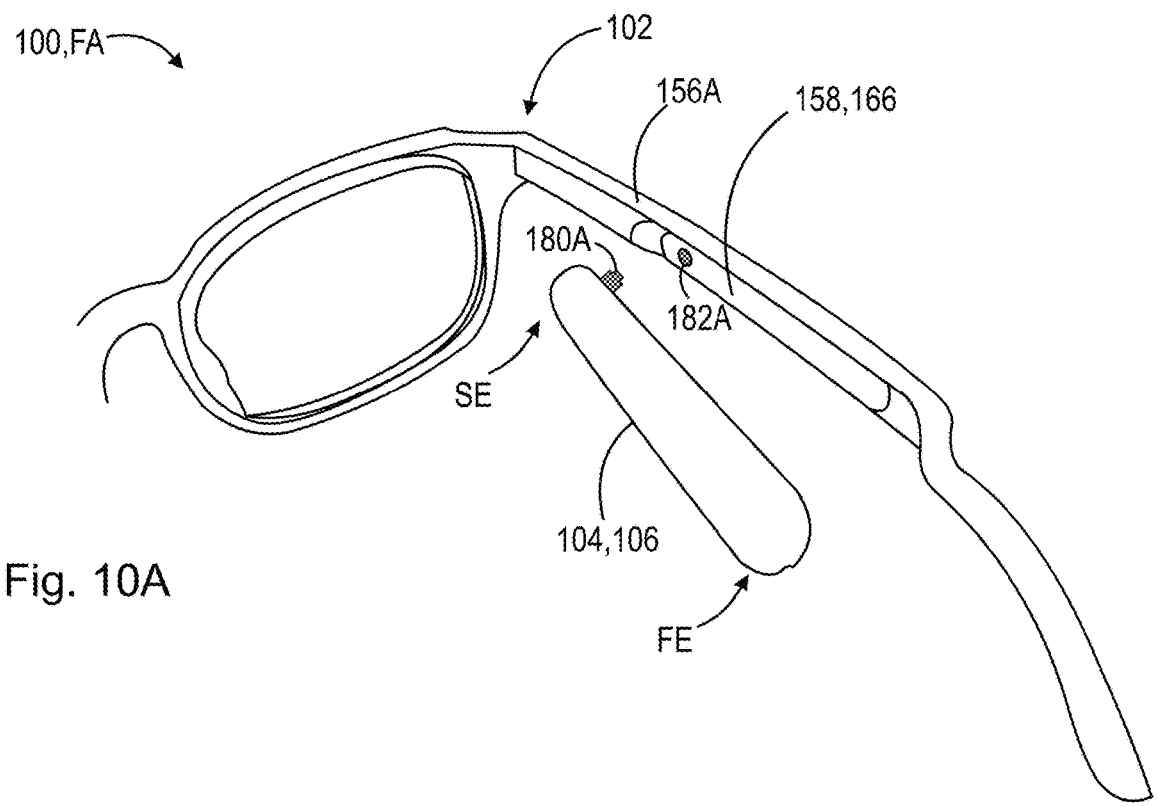
FIG. 10A is a schematic perspective view of a fastening arrangement according to the present disclosure.
Figure 10B:
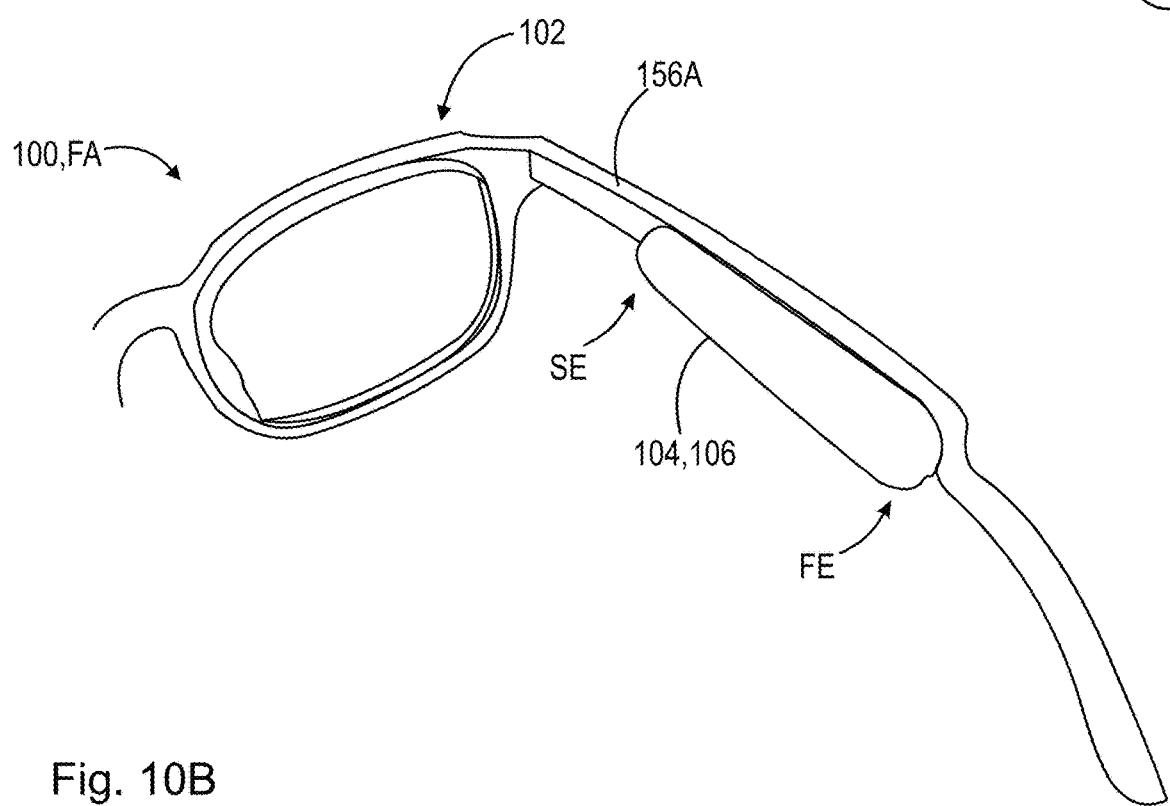
FIG. 10B is a schematic perspective view of a fastening arrangement according to the present disclosure.

FIGS. 10A-10B illustrate fastening arrangement FA in the form of a pivot locking and release mechanism. As illustrated, second end SE of acoustic module housing 106 can include a first projection 180A configured to pivotably or rotatingly engage with a receiving recess 182A within inside face 158 of socket 166. For example, protrusion 180A can be inserted within receiving recess 182A, and the entire acoustic module housing 106 can be pivoted about protrusion 180A toward inside face 158 until first end FE comes into contact with socket 166, or the entire acoustic module housing 106 can be rotated, e.g., where first end FE begins below or above socket 166 and is rotated up or down, respectively, until first end FE is aligned with socket 166. Once aligned, first end FE may be secured to socket 166 via friction fit, magnetic connection, a detent, or latch.

Figure 11A:
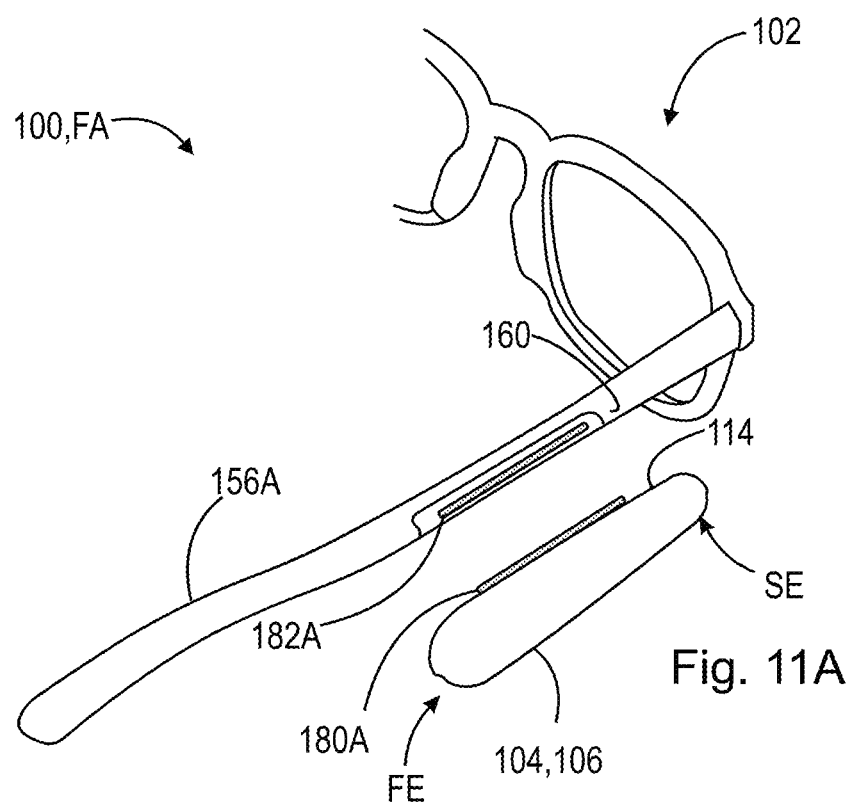
FIG. 11A is a schematic perspective view of a fastening arrangement according to the present disclosure.
Figure 11B:
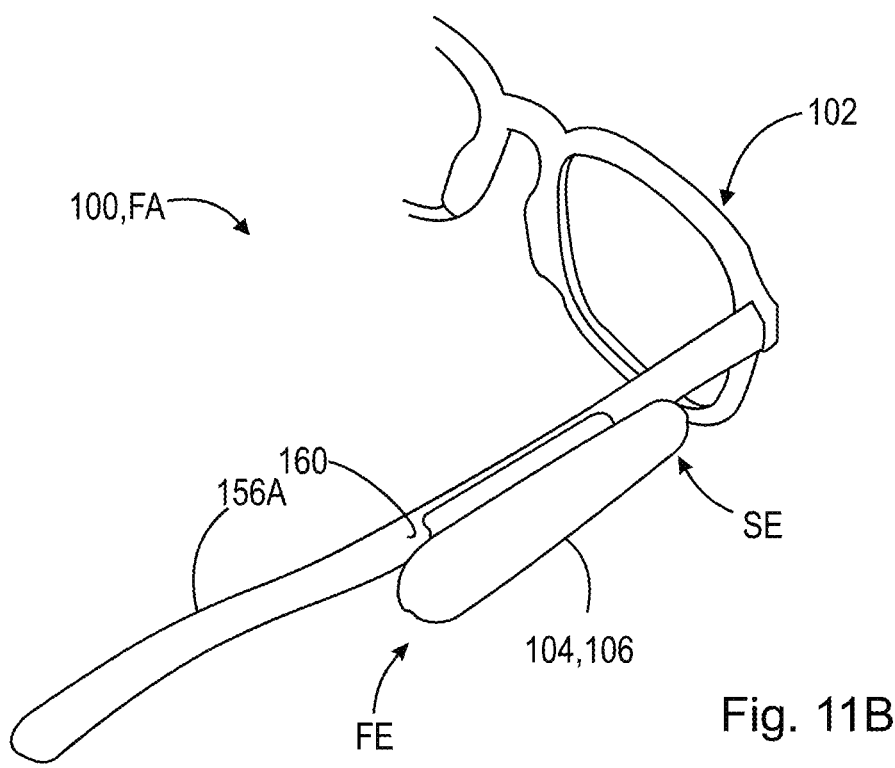
FIG. 11B is a schematic perspective view of a fastening arrangement according to the present disclosure.

FIGS. 11A-11B illustrate a fastening arrangement FA in the form of a frictional insert arrangement. As illustrated, second side surface 114 of acoustic module housing 106 may include a projection 180A protruding outward from second side surface 114. As illustrated, first protrusion 180A is intended to be a longitudinal member arranged to span at least half of the length of the acoustic module housing 106 from first end FE to second end SE. Furthermore, the outside face 160 of temple 156A may include a complementary recess 182A configured to receive first projection 180A such that acoustic module housing 106 may be removably secured to temple 156A via friction fit between first projection 180A and first receiving recess 182A. It should be appreciated that the frictional engagement shown could be aided with the addition of magnets between the second side surface 114 of acoustic module hosing 106 and the outside face 160 of temple 156A.

Figure 12A:
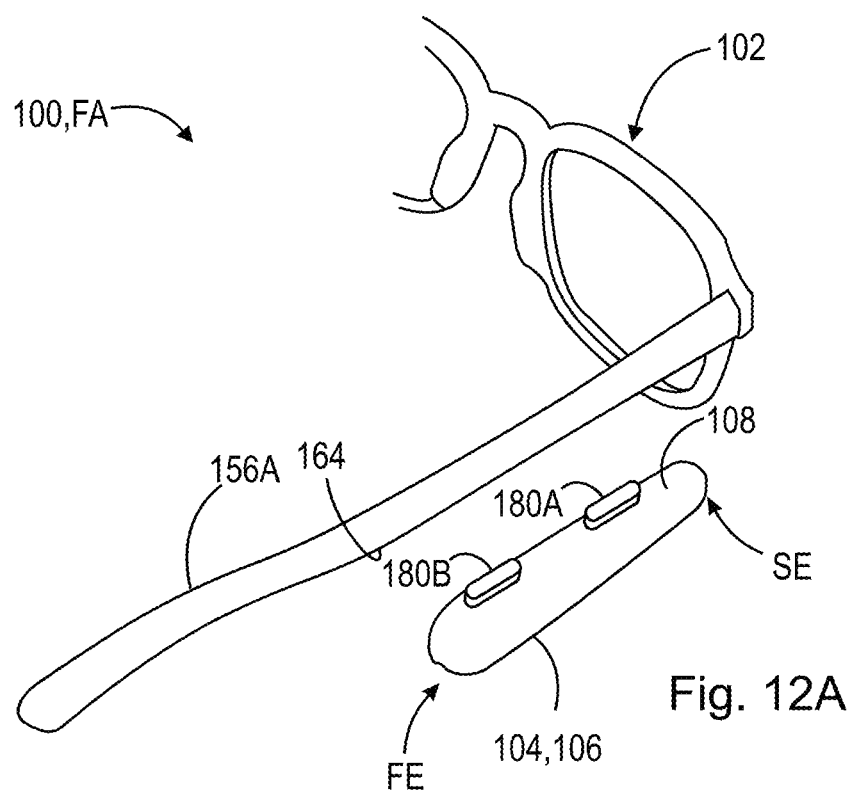
FIG. 12A is a schematic perspective view of a fastening arrangement according to the present disclosure.
Figure 12B:
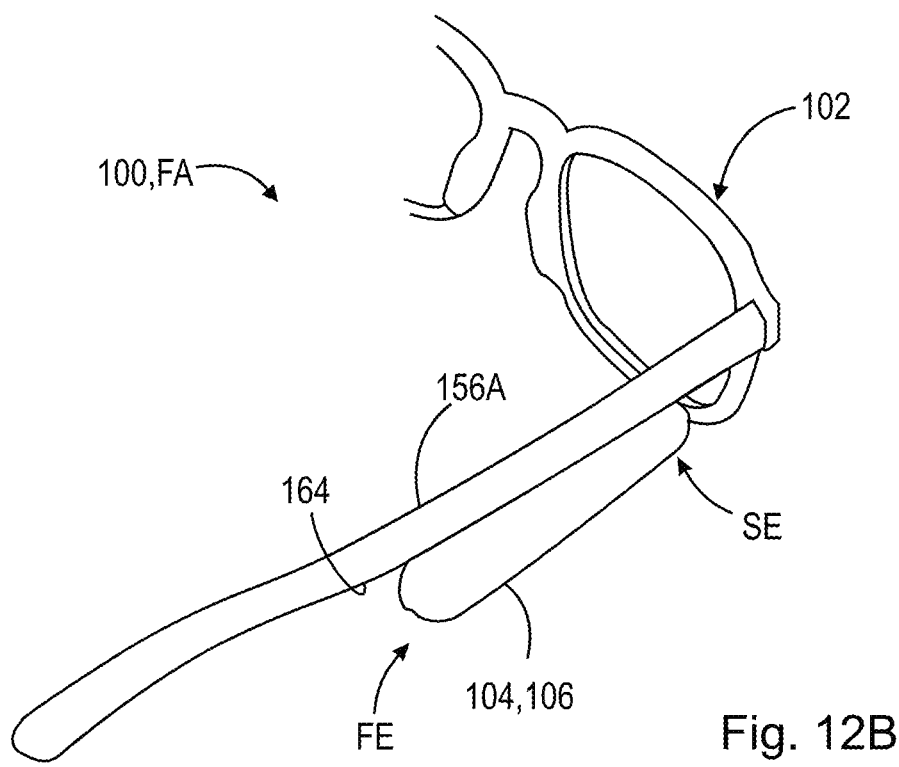
FIG. 12B is a schematic perspective view of a fastening arrangement according to the present disclosure.

FIGS. 12A-12B illustrate a fastening arrangement FA in the form of a dual frictional insert arrangement. As illustrated, top side 108 of acoustic module housing 106 includes a first projection 180A and a second projection 180B which project upward from top side 108. Each projection is intended to be a longitudinal member arranged to span at least a portion of the length of acoustic module housing 106 such that the combined lengths of the first projection 180A and the second projection 180B span at least half of the length of acoustic module housing 106. Additionally, although not illustrated, bottom surface 164 of temple 156A includes complementary receiving recesses, i.e., first receiving recess 182A and second receiving recess 182B, configured to receive each projection (e.g., first projection 180A and second projection 180B), respectively. Each projection is shaped and sized such that acoustic module housing 106 may be removably secured to temple 156A via friction fit between first projection 180A and first receiving recess 182A and friction fit between second projection 180B and second receiving recess 182B. It should be appreciated that the frictional engagement shown could be aided with the addition of magnets between the top side 108 of acoustic module hosing 106 and/or the bottom face 164 of temple 156A.

Figure 13A:
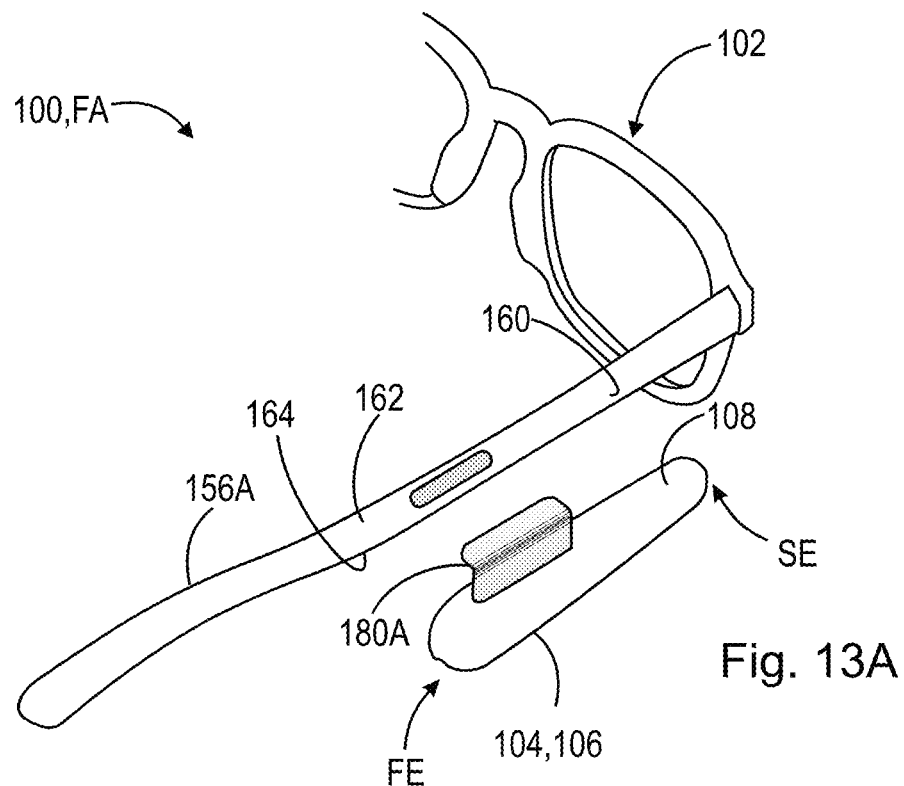
FIG. 13A is a schematic perspective view of a fastening arrangement according to the present disclosure.
Figure 13B:
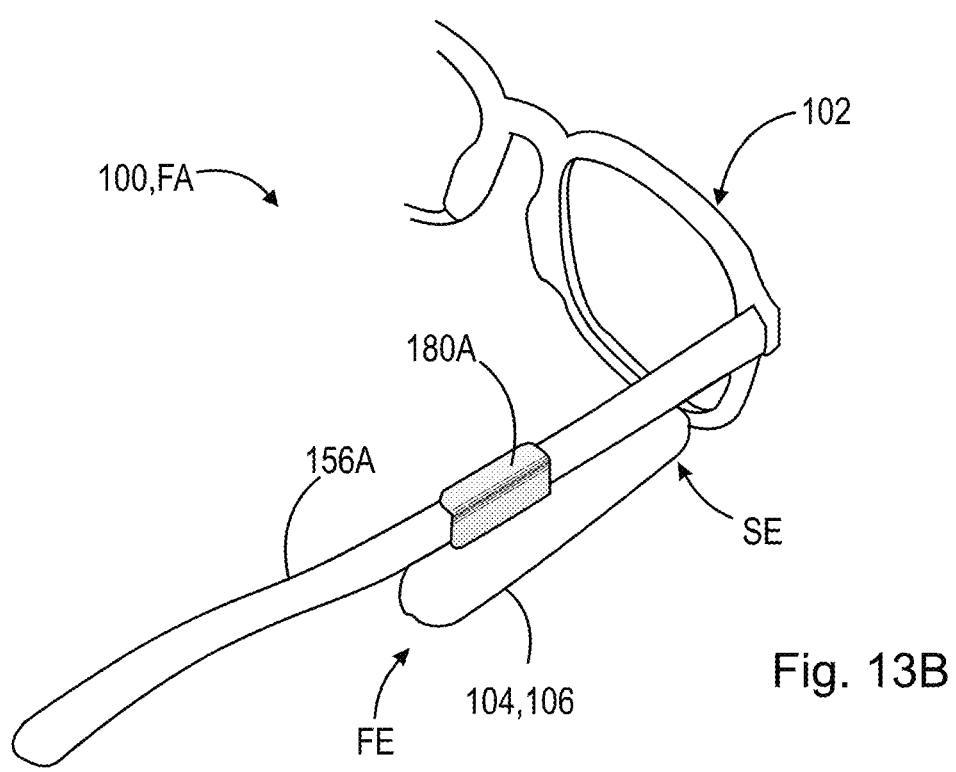
FIG. 13B is a schematic perspective view of a fastening arrangement according to the present disclosure.

FIGS. 13A-13B, illustrate a fastening arrangement FA in the form of a wrapping frictional projection arrangement. As illustrated, top side 108 of acoustic module housing 106 includes a first projection 180A having a first portion which projects upward from top side 108 and a second portion which projections inward, i.e., toward head-worn-peripheral device 102. First projection 180A is configured to be removably engaged with temple 156A via friction fit, e.g., where the inside surface of the second portion of first projection 180A is configured to make frictional contact with top surface 162 of temple 156A while the top side 108 of acoustic module housing 106 is configured to make frictional contact with bottom surface 164 of temple 156A. Thus, projection 180A is configured to pinch temple 156A between projection 180A and the top side 108 of acoustic module housing 106 keeping it secured to head-worn peripheral device 102.

Figure 14A:
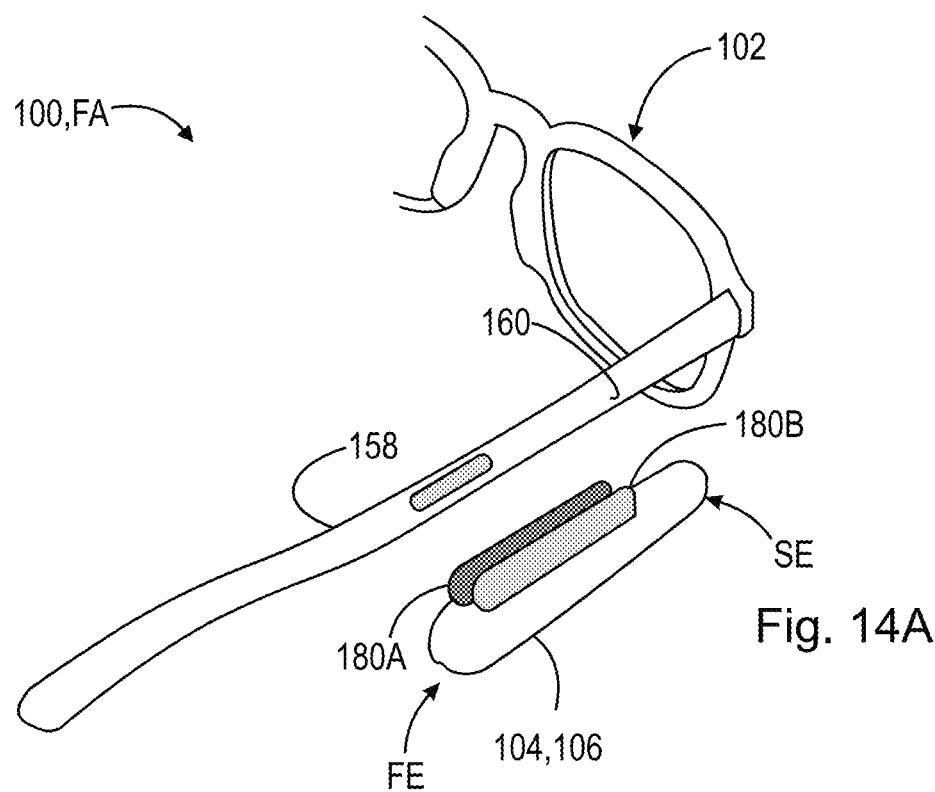
FIG. 14A is a schematic perspective view of a fastening arrangement according to the present disclosure.
Figure 14B:
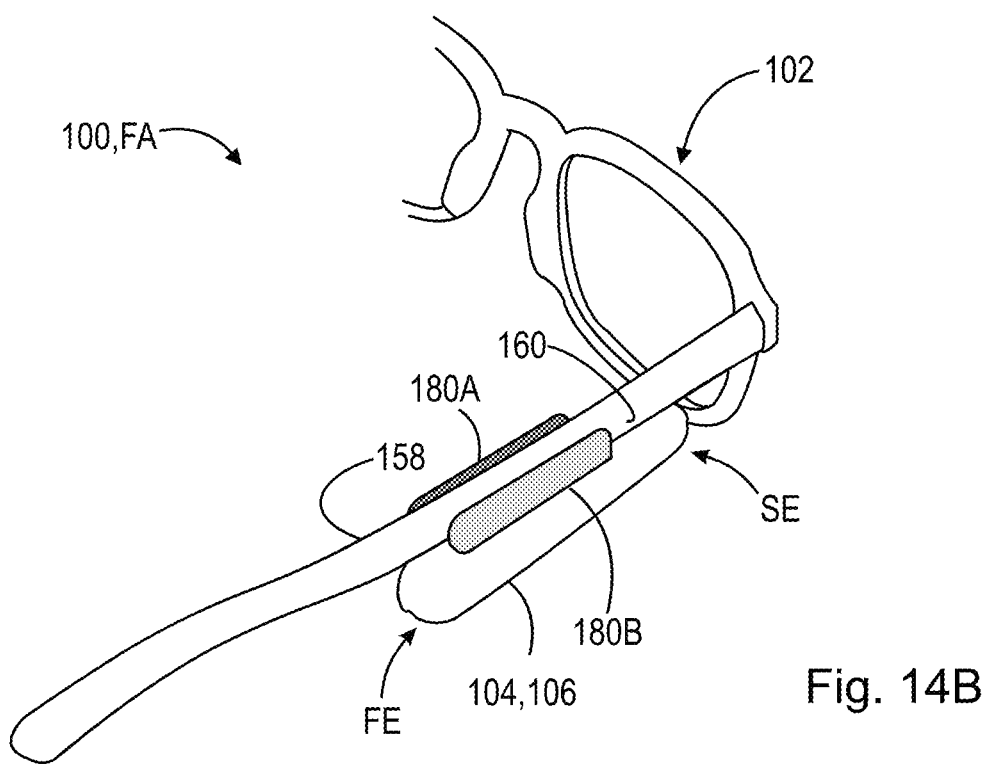
FIG. 14B is a schematic perspective view of a fastening arrangement according to the present disclosure.

FIGS. 14A-14B illustrate a fastening arrangement FA in the form of a frictional pinch arrangement. As illustrated, top side 108 of acoustic module housing 106 includes a first projection 180A and a second projection 180B. First projection 180A and second projection 180B are substantially longitudinal members arranged to span at least half of the length of the acoustic module housing 106 from first end FE to second end SE. When removably secured with head-worn peripheral device 102, the first projection 180A is configured to make frictional contact with inside face 158 of temple 156A and second projection 180B is configured to make frictional contact with outside face 160 of temple 156A such that first projection 180A and second projection 180B engage with temple 156A in a pinching frictional arrangement.

Figure 15:
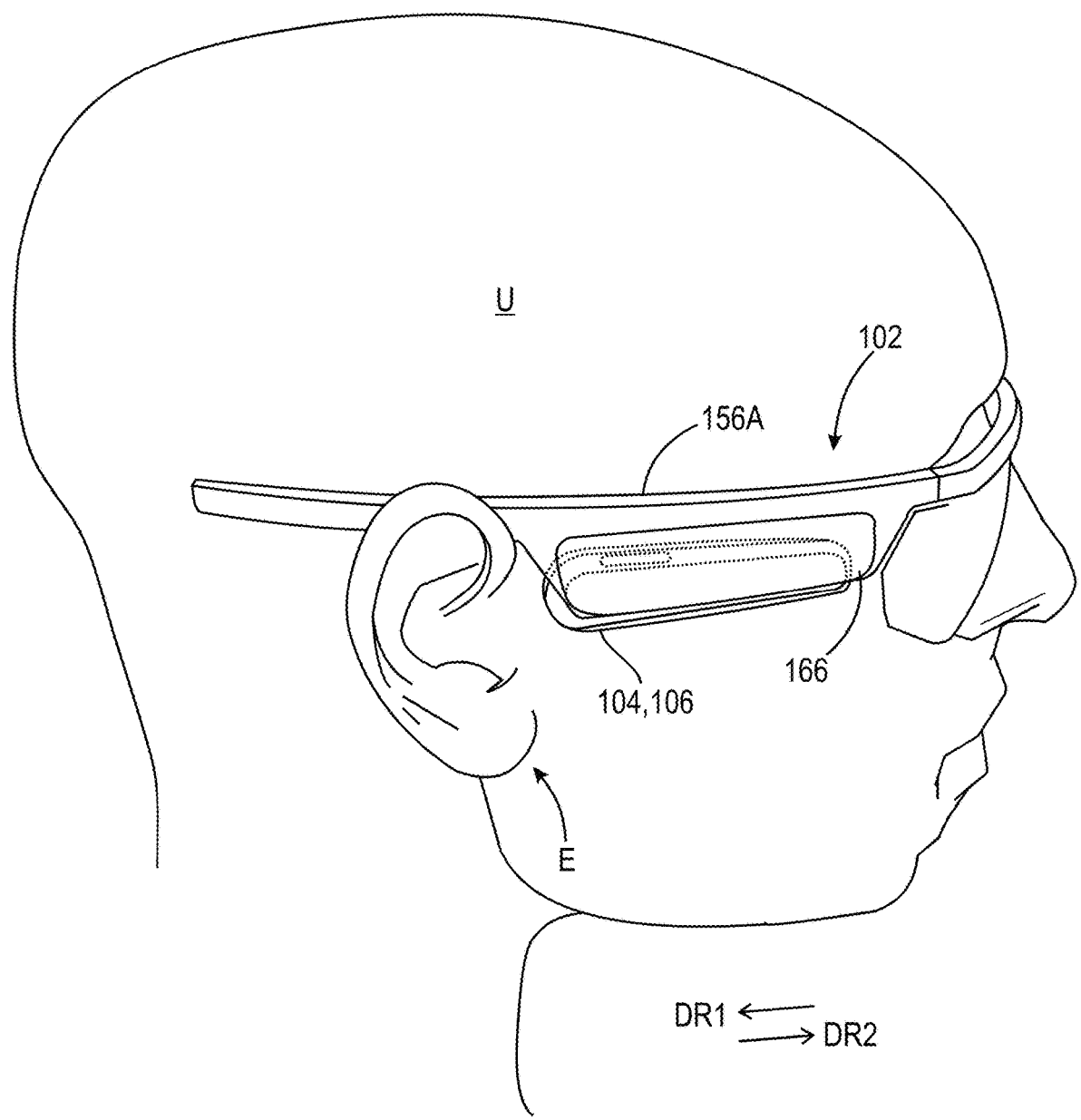
FIG. 15 is a schematic perspective view a head-worn peripheral device and a fastening arrangement according to the present disclosure.

FIG. 15 illustrates an alternate example of head-worn peripheral device 102 in the form of a pair of safety glasses. As illustrated, socket 166 is a sliding pocket arranged to slidingly engage with acoustic module housing 106 so that acoustic module housing 106 may be positioned at multiple positions relative to the ear E of user U. Additionally, should the user wish to remove acoustic module 104, the user U would simply slide the acoustic module housing 106 out of the back of the sliding pocket, i.e., toward the user's ear E. Within the sliding pocket, it should be appreciated that the frictional engagement of the side walls of the pocket is sufficient to keep acoustic module housing 106 from moving, e.g., slidingly translating in first direction DR1 or second direction DR2.

Additionally, although not illustrated, it should be appreciated that other fastening arrangements FA may be utilized to removably secure acoustic module 104 to head-worn peripheral device 102. For example, acoustic module housing 106 may be removably secured to head-worn peripheral device 102 via screws, bolts, hook and look fasteners (e.g., where inside face 158 of temple 156A includes loop-type fasteners and first side surface 112 of acoustic module housing 106 includes hook-type fasteners), suction cups (e.g., where acoustic module housing 106 includes at least one suction cup on first side surface 112 configured to engage with the inside face 158 of temple 156A), a press-fastening arrangement (e.g., a roller catch or magnetic catch as used in cabinetry hardware, where two complementary parts are pressed toward each other to engage or latch them together, and an additional press toward each other releases or disengages them), or a press-and-seal fastening arrangement (e.g., a sealing arrangement that operates like a resealable plastic bag). In another example, the fastening arrangement FA includes a spring-loaded hinge arrangement. For example, a hinged element may be pivotably secured to inside face 158 of temple 156A and biased with a spring element away from inside face 158. Acoustic module housing 106 can be secured to the hinged element and pivoted into socket 166 and engaged via, e.g., a friction fit, where the frictional engagement is not overpowered by the spring bias provided by the spring element. In another example, and although not illustrated, it should be appreciated that acoustic module housing 106 can be engaged within socket 106 via a friction fit only, and socket 166 may be configured such that acoustic module housing 106 can be removed by a see-saw pivoting motion. For example, the user may press on, e.g., first end FE of acoustic module housing 106, forcing first end FE of acoustic module housing inward. This inward motion can cause a reciprocal motion of second end SE about a pivot point proximate the center of the acoustic module housing 106, such that second end SE moves outward, i.e., away from inside face 158. In another example, the fastening arrangement FA can be an adhesive arrangement, e.g., where the acoustic module housing 106 is configured to be secured to socket 166 via an adhesive-backed label or sticker, or double-sided tape.

Figure 16:
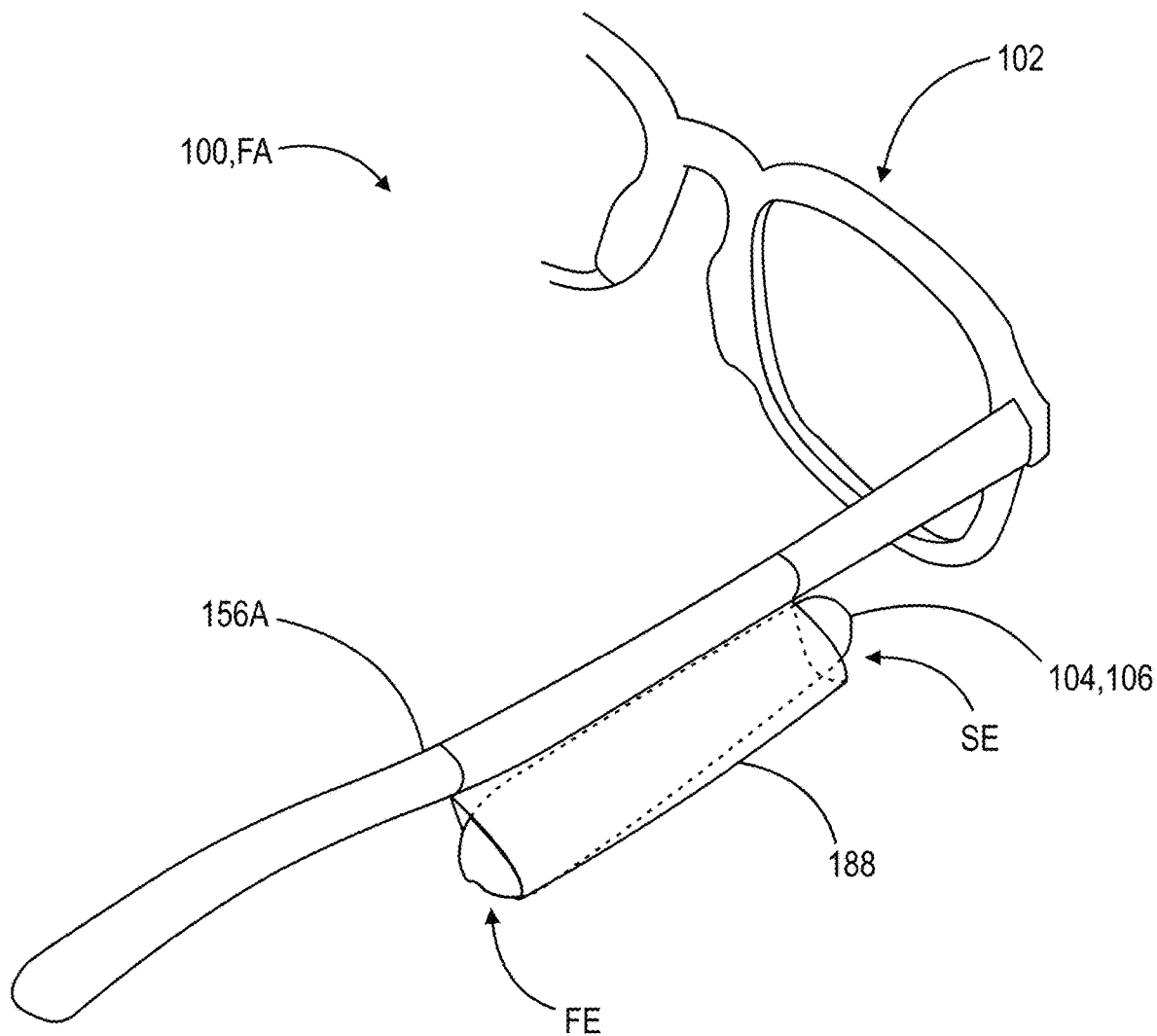
FIG. 16 is a schematic perspective view of a fastening arrangement according to the present disclosure.

FIG. 16 illustrates another example fastening arrangement FA where temple 156A of head-worn peripheral device 102 is configured to slidingly engage with a sleeve 188 where sleeve 188 includes a pocket configured to receive the acoustic module 104.

Figure 17:
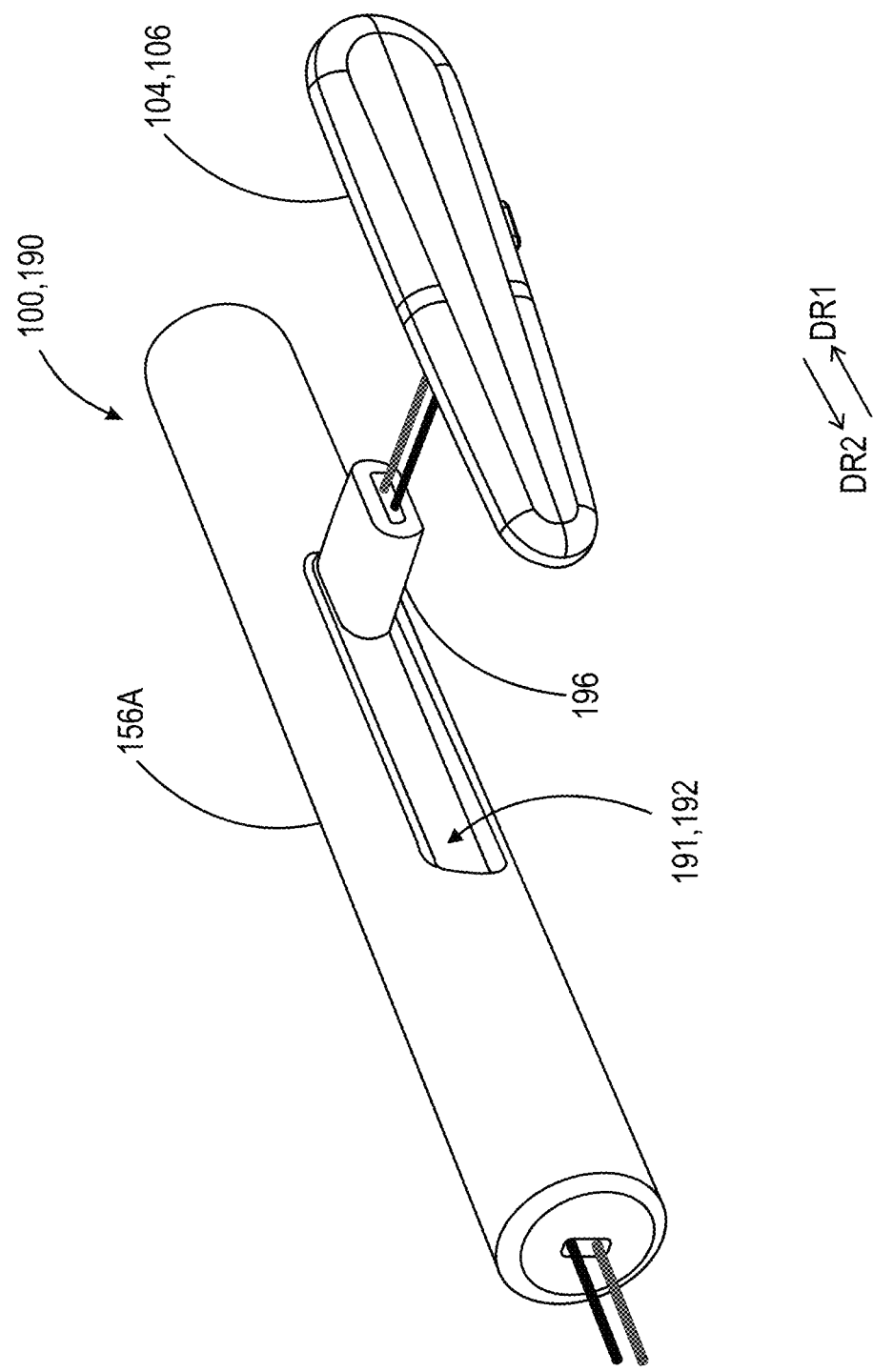
FIG. 17 is a schematic perspective view of a fastening arrangement according to the present disclosure.
Figure 18:
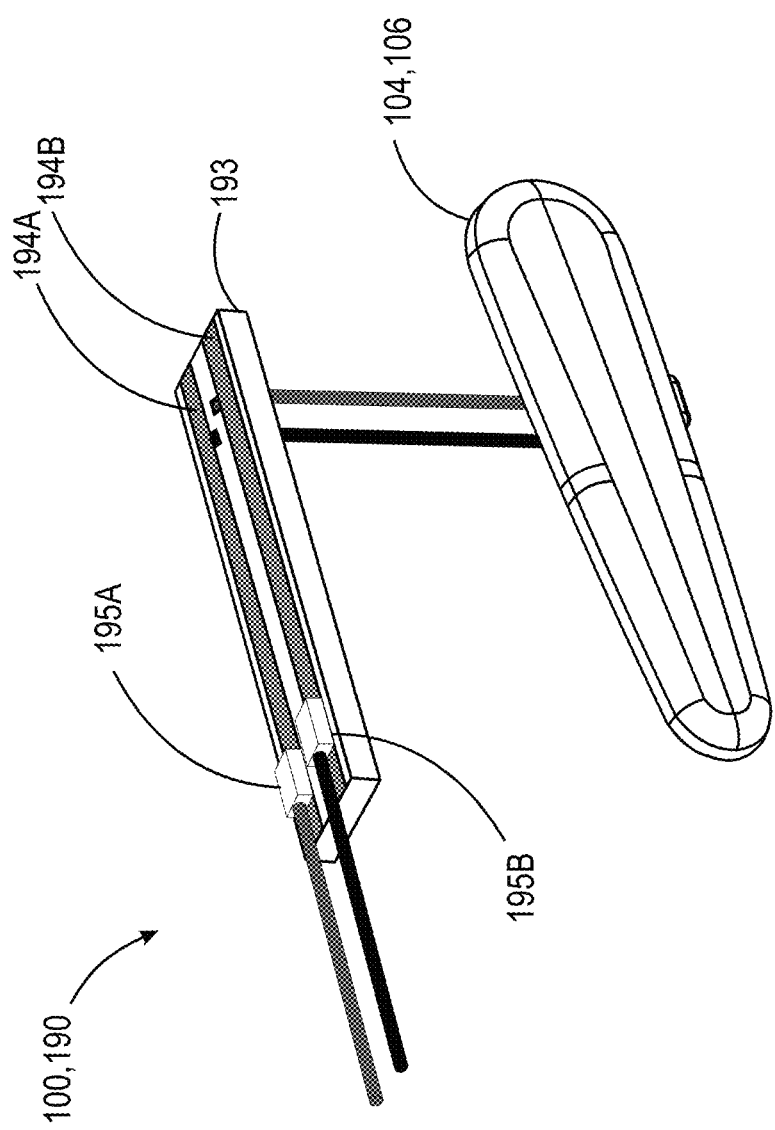
FIG. 18 is a schematic perspective view of a fastening arrangement according to the present disclosure.
Figure 19:
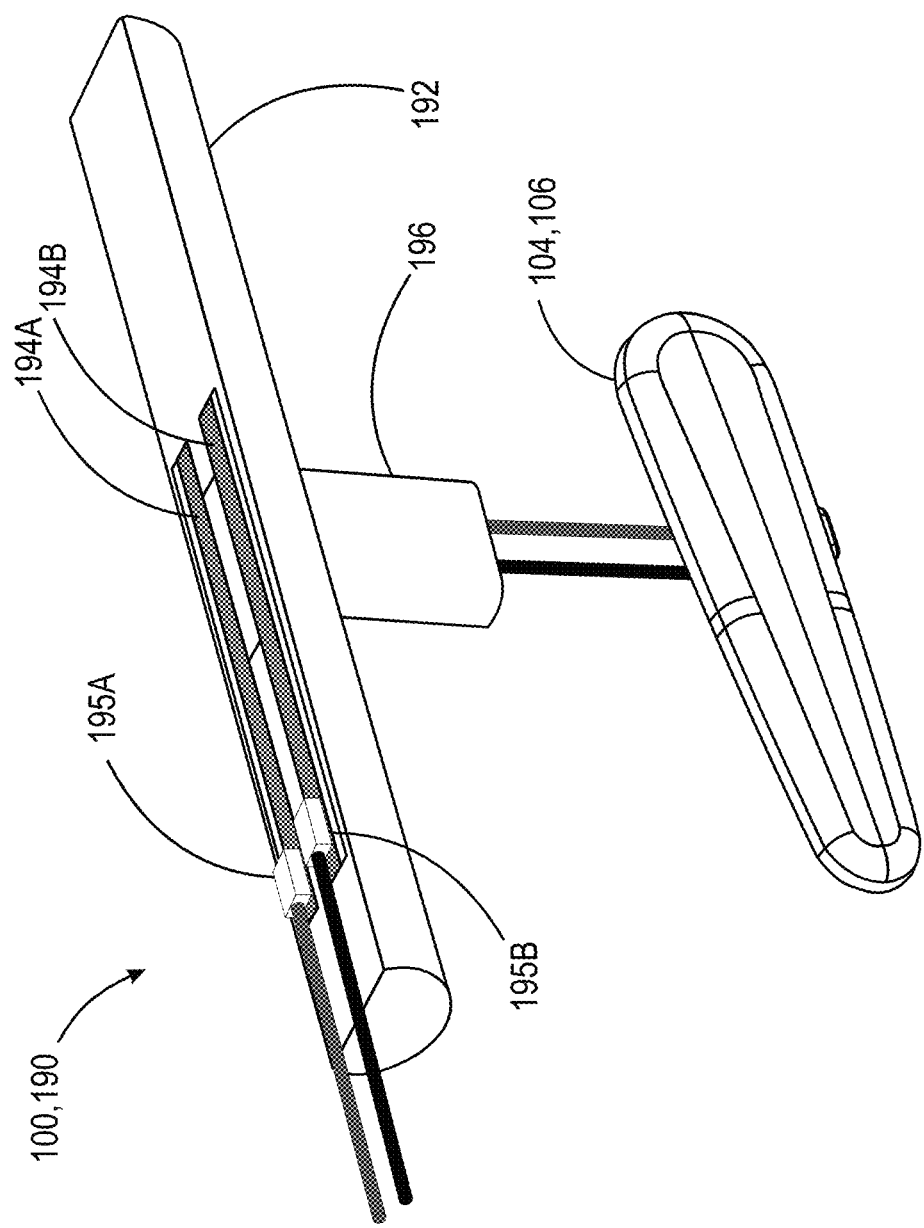
FIG. 19 is a schematic perspective view of a fastening arrangement according to the present disclosure.

FIGS. 17-19 illustrate another example fastening arrangement FA where head-worn peripheral device 102 is configured to slidingly engaged with acoustic module 104. For example, FIG. 17 shows a schematic perspective view of a conductive sliding-rail arrangement 190 according to the present disclosure. In the example illustrated, temple 156A can be substantially hollow and include a channel 191 configured to receive and slidingly engage with a slide carrier 192. As illustrated in FIGS. 18 and 19, slide carrier 192 is configured to fit within hollow channel and sliding engage with temple 156A, e.g., translate in first direction DR1 and second direction DR2. Slide carrier 192 is configured with a recess arranged to receive and matingly engage with a rail board 193 electrically coupled to a battery 152 or other power supply within head-worn peripheral device 102. Rail board 193 includes a plurality of conductive rails 194A-194B integrated within rail board 193 and configured to span the length of rail board 193 as illustrated. Each conductive rail of plurality of conductive rails 194A-194B is configured to electrically connect with a plurality of conductive leaf springs 195A-195B fixedly secured on the inside of temple 156A and within channel 191. Each leaf spring of the plurality of leaf springs 195A-195B is electrically connected to a battery 152 or other power supply within head-worn peripheral device 102 as discussed above. In one example, plurality of leaf springs 195A-195B are made of an electrically conductive material, e.g., copper, however it should be appreciated that any conductive material may be utilized, e.g., Gold, Tungsten, Aluminum, etc. Thus, as slide carrier 192 slidingly translates within channel 191 of temple 156A of head-worn peripheral device 102, first leaf spring 195A maintains electrical contact with conductive rail 194A and second leaf spring 195B maintains electrical contact with conductive rail 194B. First conductive rail 194A and second conductive rail 194B each include a through hole having an electrical connection therethrough to provide an electrical connection with to a slide connector 196 configured to engage with acoustic module 104. It should be appreciated that acoustic module housing 106 of acoustic module 104 can be configured to electrically connect to slide connector 196 via electrical wire leads as shown, or can connect to slide connector 196 directly, e.g., via a two-pin connector interface 174 arranged between slide connector 196 and the first side surface 112 of acoustic module housing 106, as discussed above. Advantageously, the example illustrated in FIGS. 17-19 allows for a physical and/or electrically powered connected, e.g., physical data connection 176 and/or physical power connection 178 (as discussed above) between acoustic module 104 and head-worn peripheral device 102. Additionally, as the position of user's ears may be at different positions on the user's head, it is desirable to allow the position of acoustic module 104 to slide relative to the head-worn peripheral device 102 and the user's ears E. Thus, conductive sliding-rail arrangement 190 allows the position of the acoustic module 104 and therefore the position of the acoustic transducer 130 to slidingly translate relative to the user's ear along temple 156A while maintaining a physical data connection 176 or a physical power connection 178. In one example, the arrangement provided allows for a range of adjustable translation between 0 mm and 30 mm, or more specifically a range of adjustable translation between 0 mm and 18 mm.

During one example operation of modular acoustic system 100, some of the functionality of the system is provided by head-worn peripheral device 102 while some of the functionality of the system is provided by the acoustic module 104. For example, acoustic module housing 106 may be engaged with head-worn peripheral device 102 using any of the fastening arrangements FA described above. When engaged, acoustic module 104 is positioned proximate an ear E of a user U such that acoustic energy AE produced by acoustic module propagates into the user's ear. To produce acoustic energy AE, acoustic module 104 includes first circuitry 120 which electrically connects at least acoustic circuitry 128 with an acoustic transducer 130. Furthermore, head-worn peripheral device 102 may extend the functionality of acoustic module 104 and/or aid in the production of acoustic energy AE. For example, head-worn peripheral device 102 may include second circuitry 138 that includes a sensor 150 and/or a battery 152. The sensor 150 may provide sensor data to acoustic module 104 via a wireless data connection, e.g., between a first antenna 136 of first circuitry 120 and a second antenna 148 of second circuitry 138, or may provide the sensor data to acoustic module 104 via a physical data connection 176, e.g., via a two-pin connection interface 174. Similarly, a battery 152 may be provided on, in, or in communication with second circuitry 138 such that stored electrical power can be provided from head-worn peripheral device 102 to acoustic module 104 so that acoustic module 104 can perform the various functions described above. It should also be appreciated that the electrical power can be provided wirelessly or via a physical power connection 178 via two-pin connection interface 174. In this way, any electrical component of modular audio system 100 can be provided in either the head-worn peripheral device (connected to second circuitry 138) or acoustic module 104 (connected to first circuitry) in any conceivable combination or arrangement.

Alternatively, in another example operation of module audio system 100, all of the functionality of the modular audio system 100 is provided acoustic module 104 while none of the functionality of the system is provided by the head-worn peripheral device 102. For example, first circuitry 120 can include the acoustic circuitry 128 and acoustic transducer to generate acoustic energy AE proximate ear E of user U, and, may also contain sensor 150 and a battery 152. In other words, the acoustic module 104 is a self-contained module capable of providing all of the functionality discussed above regardless of the head-worn peripheral device it is removably engaged with.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A removable acoustic module, comprising:
    an acoustic module housing configured to removably engage with and couple only to an inside face of a head-worn peripheral device, wherein at least a portion of the inside face of the head-worn peripheral device is formed about a substantial portion of the acoustic module housing such that, when engaged with the head-worn peripheral device, the removable acoustic module is arranged to provide acoustic energy proximate a user's ear, and wherein the at least a portion of the inside face of the head-worn peripheral device has a shape that is complementary to a shape of the acoustic module housing; and,
    first circuitry arranged within the acoustic module housing, the first circuitry comprising acoustic circuitry and an acoustic transducer, the acoustic circuitry arranged to produce a first electrical signal, the first electrical signal utilized by the acoustic transducer to produce the acoustic energy proximate the user's ear.

2. The removable acoustic module of claim 1, wherein the acoustic module housing is arranged to pivotably or magnetically couple to the head-worn peripheral device.

3. The removable acoustic module of claim 2, wherein if the acoustic module housing is arranged to magnetically couple to the removable acoustic module, the removable acoustic module further comprises a magnet arranged on or within the acoustic module housing and the head-worn peripheral device comprises a complementary magnet or magnetic plate arranged on or within the head-worn peripheral device such that the magnetic engagement between the magnet and the complementary magnet or magnetic plate allows the acoustic module housing to pivot with respect to the head-worn peripheral device.

4. The removable acoustic module of claim 3, wherein the removable acoustic module further comprises a metallic component arranged within the acoustic module housing to magnetically insulate or shield the acoustic transducer from a first magnetic field generated by the first magnet or the second magnet.

5. The removable acoustic module of claim 4, wherein the metallic component is a first antenna electrically connected to the first circuitry of the acoustic module, wherein the metallic component is configured to transmit wireless data to or receive wireless data from a second antenna arranged within the head-worn peripheral device.

6. The removable acoustic module of claim 4, wherein the metallic component is configured to increase a magnitude of the first magnetic field of the first magnet or the second magnet.

7. The removable acoustic module of claim 1, wherein the acoustic module housing is arranged to slide or translate with respect to the head-worn peripheral device.

8. The removable acoustic module of claim 1, wherein the removable acoustic module is configured to establish a connection with the head-worn peripheral device, wherein the connection is a wireless data connection, a wireless power connection, a physical data connection, or a physical power connection.

9. The removable acoustic module of claim 8, wherein the physical data connection or the physical power connection utilizes a two-pin connector interface.

10. The removable acoustic module of claim 1, wherein the head-worn peripheral device comprises a wearable eyeglass form-factor, the wearable eyeglass form-factor comprising a temple, the temple having an inside face, an outside face, a top surface and a bottom surface, and wherein the inside face is arranged to receive the removable acoustic module.

11. The removable acoustic module of claim 10, wherein the inside face of the temple further includes a socket arranged to receive and removably engage with the removable acoustic module.

12. The removable acoustic module of claim 11, wherein the socket is further configured to removably disengage with the removable acoustic module by utilizing a pivoting motion, a rotating motion, a see-saw motion, a spring-loaded hinge, a slide-button release, a sliding engagement, or a friction fit engagement.

13. The removable acoustic module of claim 1, wherein the acoustic module housing is further configured to removably engage with the head-worn peripheral device via at least one fastening arrangement, wherein the at least one fastening arrangement is selected from: a friction fit, a screw, a bolt, a hook-and-loop fastening arrangement, a suction cup arrangement, a press fastening arrangement, a press-and-seal fastening arrangement, a slide-button release mechanism, a frictional insert arrangement, a dual-frictional insert arrangement, a wrapping frictional projection arrangement, a frictional pinch arrangement, or a conductive sliding-rail arrangement.

14. The removable acoustic module of claim 1, wherein the first circuitry is arranged to receive a first power signal from a battery, wherein the battery is arranged within the removable acoustic module housing or, on or in the head-worn peripheral device.

15. The removable acoustic module of claim 1, wherein the first circuitry comprises a first antenna arranged within the acoustic module housing, the first antenna configured to receive a wireless signal from a second antenna arranged on or in the head-worn peripheral device, or an additional peripheral device.

16. The removable acoustic module of claim 1, further comprising a sensor configured to communicate with the first circuitry of the removable acoustic module or second circuitry of the head-worn peripheral device, wherein the sensor is arranged on or in the acoustic module housing, or, on or in the head-worn peripheral device.

17. The removable acoustic module of claim 16, wherein the sensor is a microphone and wherein the microphone is arranged on or within the acoustic module housing or on or within the head-worn peripheral device.

18. The removable acoustic module of claim 16, wherein the sensor is selected from: a gyroscope, an accelerometer, a magnetometer, a force sensor, an ultrasonic sensor, a pressure sensor, a proximity sensor, a Light Detection and Ranging (LIDAR) sensor, a temperature sensor, a humidity sensor, an ambient light sensor, an Ultra-Violet (UV) sensor, an infrared (IR) sensor, a daylight sensor, a button, or a touch-capacitive sensor.

19. The removable acoustic module of claim 1, wherein the acoustic module housing further comprises a first port and a second port, wherein the first port is arranged proximate the user's ear on a first surface of the acoustic module housing and the second port is arranged on a second surface of the acoustic module housing.

20. The removable acoustic module of claim 1, wherein the head-worn peripheral device is selected from: a hat, a visor, a helmet, a ski-helmet, a pair of ski-goggles, or a headband.

21. A head-worn peripheral device configured to receive an acoustic module housing of a removable acoustic module, such that the removable acoustic module is configured to provide acoustic energy proximate a user's ear via first circuitry arranged within the acoustic module housing, the first circuitry comprising an acoustic circuitry and an acoustic transducer, the acoustic circuitry arranged to produce a first electrical signal, the first electrical signal utilized by the acoustic transducer to produce the acoustic energy proximate the user's ear, wherein the head-worn peripheral device includes at least one side or surface of an inside face of a temple, the at least one side or surface configured to frictionally engage with a protrusion of the removable acoustic module; or wherein the head-worn peripheral device includes a receiving recess on or in the at least one side or surface of the inside face of the temple, the receiving recess configured to receive a protrusion of the removable acoustic module, wherein the protrusion of the removable acoustic module does not include electrical contacts and the protrusion has a length that is at least approximately half the length of the acoustic module housing.

22. A modular audio system, comprising:
a head-worn peripheral device configured to connect with a removable acoustic module, the head-worn peripheral device comprising a slidable sleeve, the slidable sleeve configured to receive the removable acoustic module; and,
the removable acoustic module, the removable acoustic module comprising:
an acoustic module housing configured to removably engage with a pocket of the slidable sleeve such that, when the acoustic module housing is engaged with the head-worn peripheral device the removable acoustic module is arranged to provide acoustic energy proximate a user's ear; and,
first circuitry arranged within the acoustic module housing, the first circuitry comprising acoustic circuitry and an acoustic transducer, the acoustic circuitry arranged to produce a first electrical signal, the first electrical signal utilized by the acoustic transducer to produce the acoustic energy proximate the user's ear.

* * * * *